(12) United States Patent
Kim et al.

(10) Patent No.: US 7,289,180 B2
(45) Date of Patent: Oct. 30, 2007

(54) LIQUID CRYSTAL DISPLAY DEVICE OF A HORIZONTAL ELECTRIC FIELD APPLYING TYPE COMPRISING A STORAGE CAPACITOR SUBSTANTIALLY PARALLEL TO THE DATA LINE AND FABRICATING METHOD THEREOF

(75) Inventors: Woo Hyun Kim, Seoul (KR); Yong Bum Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 8 days.

(21) Appl. No.: 10/875,293

(22) Filed: Jun. 25, 2004

(65) Prior Publication Data
US 2004/0263751 A1     Dec. 30, 2004

(30) Foreign Application Priority Data
Jun. 28, 2003     (KR) ............... 10-2003-0042944

(51) Int. Cl.
    *G02F 1/1343* (2006.01)
(52) U.S. Cl. .................. 349/141; 349/38; 349/39
(58) Field of Classification Search ........... 349/139, 349/141, 39
    See application file for complete search history.

(56) References Cited

U.S. PATENT DOCUMENTS

| | | | |
|---|---|---|---|
| 6,337,726 B1* | 1/2002 | Kawano et al. | 349/141 |
| 2002/0057411 A1* | 5/2002 | Kim et al. | 349/141 |
| 2002/0180901 A1* | 12/2002 | Kim | 349/43 |
| 2003/0043329 A1* | 3/2003 | Park | 349/141 |
| 2003/0107037 A1* | 6/2003 | Youn et al. | 257/59 |
| 2004/0066481 A1* | 4/2004 | Hong et al. | 349/141 |

* cited by examiner

*Primary Examiner*—Andrew Schechter
*Assistant Examiner*—W. Patty Chen
(74) *Attorney, Agent, or Firm*—McKenna Long & Aldridge LLP

(57) ABSTRACT

A liquid crystal display panel and a fabricating method thereof for improving an aperture ratio. The liquid crystal display panel of a horizontal electric field applying type including: a gate line formed on a substrate; a data line crossing the gate line, with a gate insulating film positioned therebetween, the crossing of the data line and gate line defining a pixel region; a thin film transistor including a source electrode and a drain electrode formed at the crossing of the gate and data lines; a passivation film for protecting the thin film transistor; a common line overlapped with and insulated from at least one of the gate line and the data line; a common electrode connected to the common line and formed in the pixel region; and a pixel electrode connected to the drain electrode, wherein a horizontal electric field is formed between the common electrode and the pixel electrode.

26 Claims, 32 Drawing Sheets

WHITE

BLACK

T=0.1%

LIQUID CRYSTAL DISPLAY DEVICE OF A HORIZONTAL ELECTRIC FIELD APPLYING TYPE COMPRISING A STORAGE CAPACITOR SUBSTANTIALLY PARALLEL TO THE DATA LINE AND FABRICATING METHOD THEREOF

This application claims the benefit of Korean Patent Application No. P2003-42944 filed on Jun. 28, 2003, which is hereby incorporated by reference for all purposes as if fully set forth herein.

BACKGROUND OF THE INVENTION

1. Field of the Invention

The present invention relates to a liquid crystal display panel having a horizontal electric field. More particularly, the present invention relates to a liquid crystal display panel and a method of fabricating the same that improve an aperture ratio.

2. Description of the Related Art

In general, a liquid crystal display (LCD) device controls light transmittance of liquid crystal material using an electric field to display a picture. The liquid crystal display device is classified into a vertical electric field type and a horizontal electric field type based upon a direction of the electric field driving the liquid crystal.

The liquid crystal display device of the vertical electric field type, in which a common electrode formed on an upper substrate and a pixel electrode formed on a lower substrate are arranged to face each other, drives a liquid crystal of a twisted nematic (TN) mode using a vertical electric field formed between the common electrode and the pixel electrode. The liquid crystal display device of the vertical electric field type has an advantage of a large aperture ratio; however, it has a defect of a narrow viewing angle of about 90°.

The liquid crystal display device of the horizontal electric field type drives a liquid crystal of an in-plane switch (hereinafter referred to as "IPS") mode using a horizontal electric field between the pixel electrode and the common electrode parallel on the lower substrate. The liquid crystal display device of the horizontal electric field type has an advantage of a wide viewing angle of about 160°. Hereinafter, the liquid crystal display device of horizontal electric field type will be described in detail.

The liquid crystal display device of the horizontal electric field type includes a thin film transistor array substrate (a lower substrate) and a color filter array substrate (an upper substrate) that face and are joined to each other, a spacer for uniformly maintaining a cell gap between the two substrates and a liquid crystal injected into a space provided by the spacer.

The thin film transistor array substrate includes a plurality of signal lines for forming a horizontal electric field on a basis of a pixel, a plurality of thin film transistors, and an alignment film applied for a liquid crystal alignment thereon. The color filter array substrate includes a color filter for representing a color, a black matrix for preventing light leakage and an alignment film applied for a liquid crystal alignment thereon.

FIG. 1 is a plan view illustrating a part of a related art thin film transistor substrate of a horizontal electric field type, and FIG. 2 is a sectional view of the thin film transistor array substrate taken along the line I-I' in FIG. 1.

In FIGS. 1 and 2, the related art thin film transistor array substrate of the horizontal electric field type includes a gate line 2 and a data line 4 formed on a lower substrate 45 crossing each other, a thin film transistor 6 formed at each crossing, a pixel electrode 14 and a common electrode 18 formed in order to apply the horizontal electric field in pixel regions defined by the crossing and a common line 16 connected to the common electrode 18. Moreover, the related art thin film transistor array substrate further comprises a storage capacitor 20 formed an overlapped portion between the pixel electrode 14 and the common line 16.

The gate line 2 supplies a gate signal to the gate electrode 8 of the thin film transistor 6. The data line 4 supplies a pixel signal to the pixel electrode 14 via a drain electrode 12 of the thin film transistor 6. The gate line 2 and the data line 4 are formed in a crossing arrangement to define the pixel region 5.

The common line 16 is formed parallel to the gate line 2 and supplies a reference voltage for driving the liquid crystal to the common electrode 18.

The thin film transistor 6 responds to the gate signal of the gate line 2 so that the pixel signal of the data line 4 is charged to the pixel electrode 14. To this end, the thin film transistor 6 comprises a gate electrode 8 connected to the gate line 2, a source electrode 10 connected to the data line 4 and a drain electrode 12 connected to the pixel electrode 14. Further, the thin film transistor 6 includes an active layer 15 overlapping the gate electrode 8 with a gate insulating film 46 positioned between the thin film transistor 6 and the gate electrode 8 and defining a channel between the source electrode 10 and the drain electrode 12. On the active layer 15, an ohmic contact layer 48 for making an ohmic contact with the source electrode 10 and the drain electrode 12 is further formed.

The pixel electrode 14, which is connected to a storage electrode 22 connected the drain electrode 12 of the thin film transistor 6 via a first contact hole 13 passing through a passivation film 34, is formed in the pixel region 5. The pixel electrode 14 comprises a first horizontal part 14A formed in parallel with the gate line 2 and a second horizontal part 14B formed to overlap the common line 16 and a finger part 14C formed parallel to the common electrode 18 between the first horizontal part 14A and the second horizontal part 14B.

The common electrode 18 is connected to the common line 16 and is formed in the pixel region 5. In addition, the common electrode 18 is formed parallel to the finger part 14C of the pixel electrode 14 in the pixel region 5.

Accordingly, a horizontal electric field is formed between the pixel electrode 14, to which the pixel signal is supplied via the thin film transistor 6, and the common electrode 18, to which the reference voltage is supplied via the common line 16. Moreover, the horizontal electric field is formed between the finger part 14C of the pixel electrode 14 and the common electrode 18. The liquid crystal molecules arranged in a horizontal direction between the thin film transistor array substrate and the color filter array substrate rotate due to a dielectric anisotropy. The light transmittance transmitting the pixel region 5 differs in accordance with a rotation amount of the liquid crystal molecules and thereby the pictures can be represented.

The storage capacitor 20 is connected to the common electrode 18, the storage electrode 22 overlapping the common electrode 18 with the gate insulating film 46, and a pixel electrode 14 via a second contact hole 21 passing through the storage electrode 22 and the passivation film 34. The storage capacitor 20 allows a pixel signal charged in the pixel electrode 14 to be maintained until the next pixel signal is charged.

FIGS. 3A to 3E are sectional views sequentially illustrating a method of manufacturing the thin film transistor array substrate shown in FIG. 2.

A gate metal layer is deposited on the lower substrate 45 by a deposition technique such as sputtering. Then, the gate metal layer is patterned by photolithography and an etching process using a mask. A gate pattern including the gate line 2, the gate electrode 8, the common line 16 and common electrode 18 are formed. Herein, a gate metal is formed with a mono layer or a double layer of chrome (Cr), molybdenum (Mo) or an aluminum or aluminum alloy metal.

In FIG. 3B, a gate insulating film 46 is formed on the lower substrate 45 provided with the gate pattern. The gate insulating film 46 is made of an inorganic insulating material such as silicon oxide (SiOx) or silicon nitride (SiNx).

On the lower substrate 45 provided with the gate insulating film 46, an amorphous silicon layer, a n+ amorphous silicon layer are sequentially provided by deposition techniques such as the plasma enhanced chemical vapor deposition (PECVD) and the sputtering.

The amorphous silicon layer and the n+ amorphous silicon layer are patterned by a photolithography process and an etching process using a mask. Accordingly, the active layer 15 and the ohmic contact layer 48 are formed as shown in FIG. 3B.

On the lower substrate 45 provided with the active layer 15 and the ohmic contact layer 48, a source/drain metal layer is entirely formed by deposition techniques such as the plasma enhanced chemical vapor deposition (PECVD) and the sputtering, etc.

On the source/drain metal layer, a photo-resist pattern is formed by a photolithography process using a mask.

Subsequently, the source/drain metal layer is patterned by a wet etching process using the photo-resist pattern. Accordingly, the source/drain patterns including the data line 4, the source electrode 10, the drain electrode 12 and the storage electrode 22 are formed.

Next, the ohmic contact layer 48 of a channel portion is etched using the source electrode 10 and the drain electrode 12 as a mask to thereby expose the active layer of the channel portion.

Herein, the source/drain metal layer is made of molybdenum (Mo), titanium (Ti), tantalum (Ta) or molybdenum alloy.

On the lower substrate 45 provided with the source/drain patterns, a passivation film 34 is entirely formed by deposition techniques such as a plasma enhanced chemical vapor deposition (PECVD) and a sputtering. The passivation film 34 is then patterned by the photolithography process and the etching process using a mask. Accordingly, a first and a second contact holes 13 and 21 are formed as shown in FIG. 3D. The first contact hole 13 is formed in such a manner as to pass through the passivation film 34 and expose the drain electrode 12, whereas the second contact hole 21 is formed in such a manner to pass through the passivation film 34 and exposes the storage electrode 22. Herein, the passivation film 34 is made of an inorganic insulating material such as silicon oxide (SiOx) or silicon nitride (SiNx).

On the lower substrate 45 provided with the passivation film 34, a transparent electrode material is deposited by a deposition technique such as sputtering. The transparent electrode material is then patterned by photolithography and the etching process using a mask. Accordingly, the pixel electrode 14 is formed as shown in FIG. 3E. The pixel electrode 14 is electrically connected, via the first contact hole 13, to the drain electrode 12 and is electrically connected, via the second contact hole 21, to the storage electrode 22. The transparent electrode material may be indium-tin-oxide (ITO), tin-oxide (TO) or indium-zinc-oxide (IZO).

As described above, the related art thin film transistor array substrate of a horizontal electric field type liquid crystal display device has a problem that an aperture ratio is reduced in accordance with areas of the common electrode 18 and the common line 16 at the pixel region 5.

SUMMARY OF THE INVENTION

Accordingly, the present invention is directed to a liquid crystal display having a horizontal electric field and a method of fabricating the same that substantially obviate one or more of the problems due to limitations and disadvantages of the related art, and that are capable of improving an aperture ratio.

Additional features and advantages of the invention will be set forth in the description which follows, and in part will be apparent from the description, or may be learned by practice of the invention. In order to achieve these and other advantages of the invention, a liquid crystal display device of a horizontal electric field applying type according to the present invention comprises: a gate line formed on a substrate; a data line crossing the gate line with a gate insulating film positioned therebetween, the crossing of the data line and gate line defining a pixel region; a thin film transistor including a source electrode and a drain electrode formed at the crossing of the gate and data lines; a passivation film for protecting the thin film transistor; a common line overlapped with and insulated from at least one of the gate line and the data line; a common electrode connected to the common line and formed in the pixel region; and a pixel electrode connected to the drain electrode, wherein a horizontal electric field is formed between the common electrode and the pixel electrode.

In another embodiment, a method of fabricating a liquid crystal display panel of a horizontal electric field applying type, comprising: forming a gate line on a substrate; forming a data line crossing the gate line with a gate insulating film positioned therebetween, the crossing of the data and gate line defining a pixel region; forming a thin film transistor including a source electrode and a drain electrode formed at the crossing of the gate and data lines; forming a passivation film to protect the thin film transistor; forming a common line overlapped with and insulated from at least one of the gate line and the data line; forming a common electrode connected to the common line and formed in the pixel region; and forming a pixel electrode connected to the drain electrode, wherein a horizontal electric field is formed between the common electrode and the pixel electrode.

It is to be understood that both the foregoing general description and the following detailed description are exemplary and explanatory and are intended to provide further explanation of the invention as claimed.

BRIEF DESCRIPTION OF THE DRAWINGS

These and other advantages of the invention will be apparent from the following detailed description of the embodiments of the present invention with reference to the accompanying drawings, in which.

DETAILED DESCRIPTION OF THE ILLUSTRATED EMBODIMENTS

Reference will now be made in detail to the embodiments of the present invention, examples of which are illustrated in the accompanying drawings.

Hereinafter, the embodiments of the present invention will be described in detail with reference to FIGS. 4 to 21.

Figure 1:
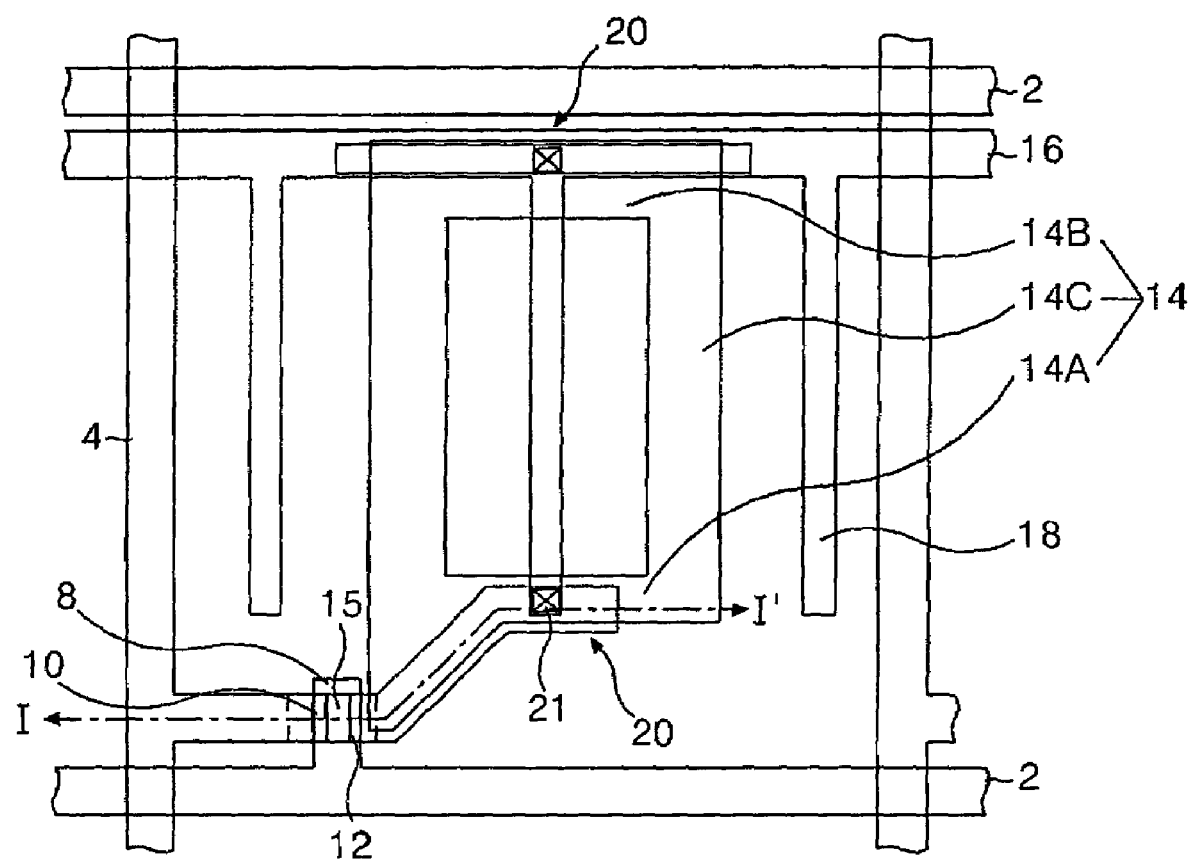
FIG. 1 is a plan view illustrating a related art thin film transistor array substrate of liquid crystal display device of a horizontal electric field applying type.
Figure 2:
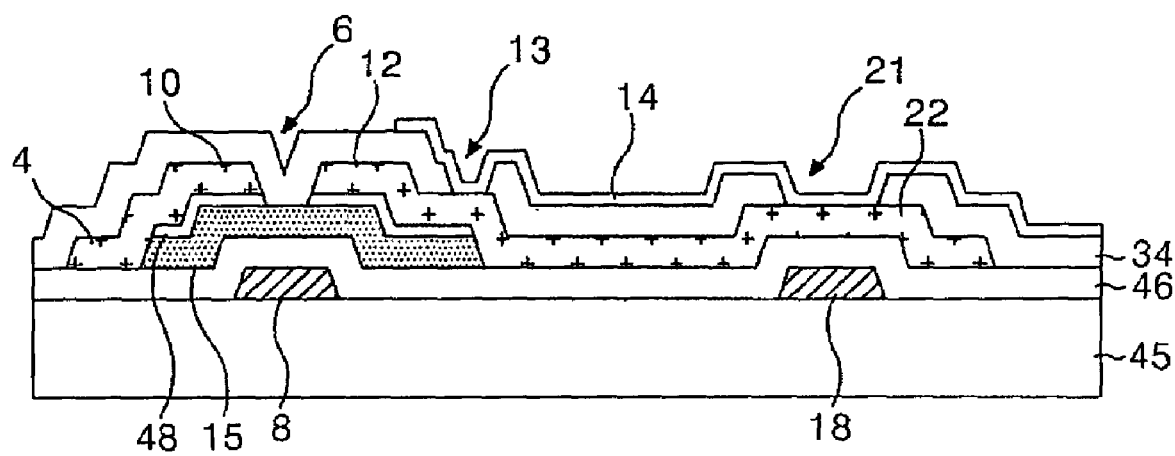
FIG. 2 is a sectional view of the thin film transistor array substrate taken along the line I-I' in FIG. 1.
Figure 3A:
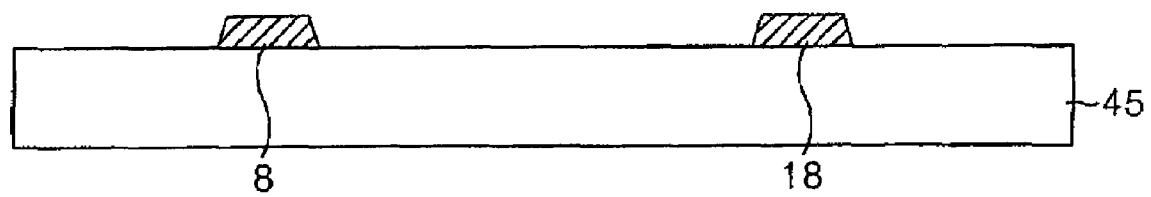
FIGS. 3A to 3E are sectional views sequentially illustrating a method of manufacturing the thin film transistor array substrate shown in FIG. 2.
Figure 3B:
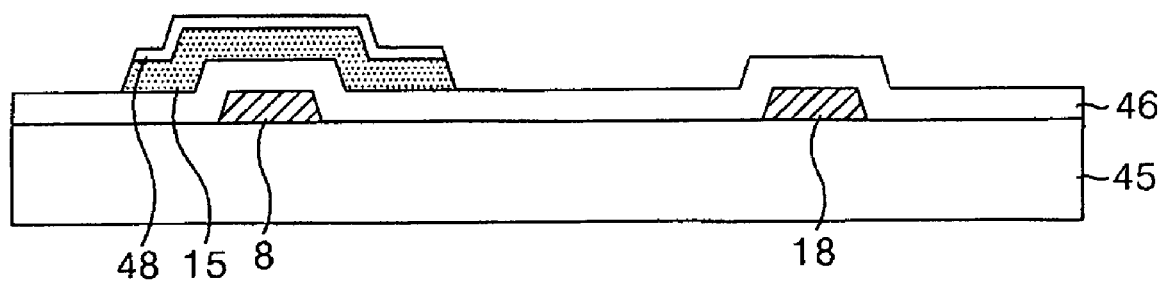
Figure 3C:
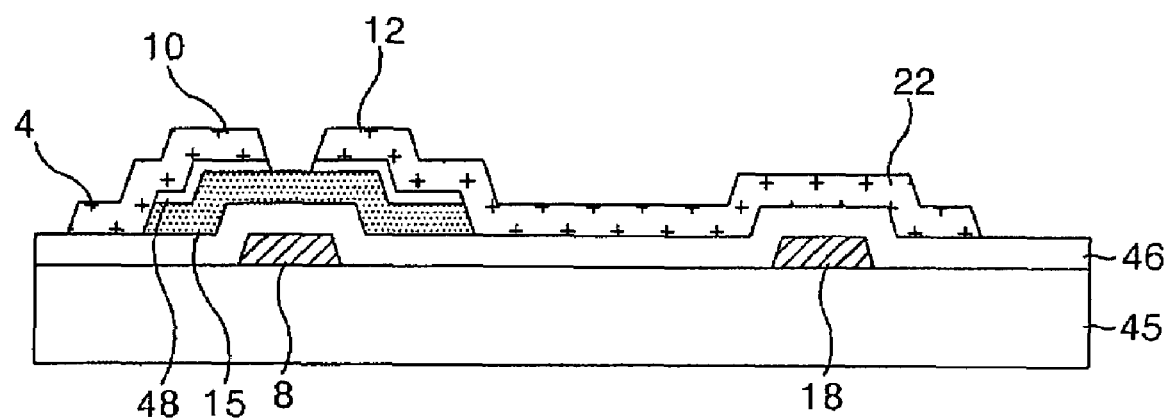
Figure 3D:
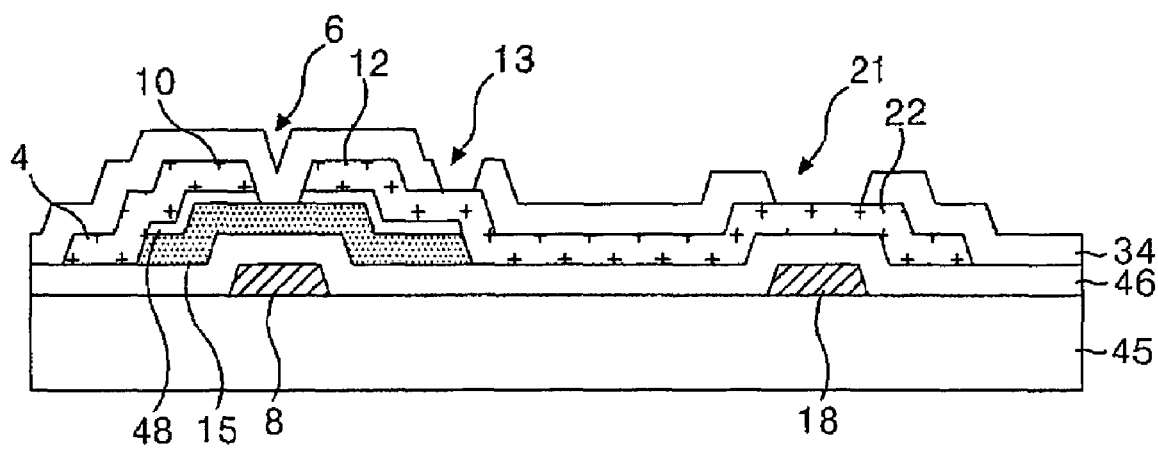
Figure 3E:
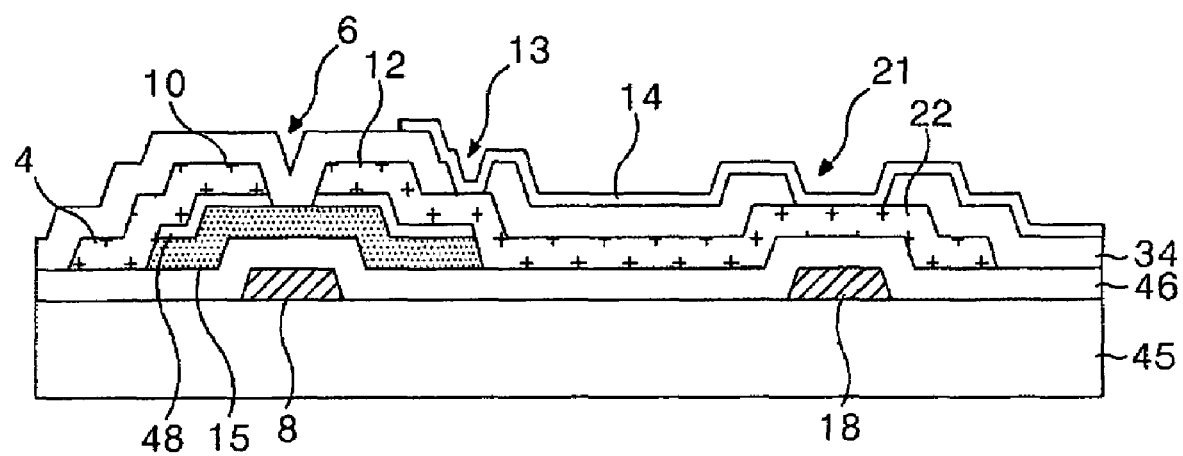
Figure 4:
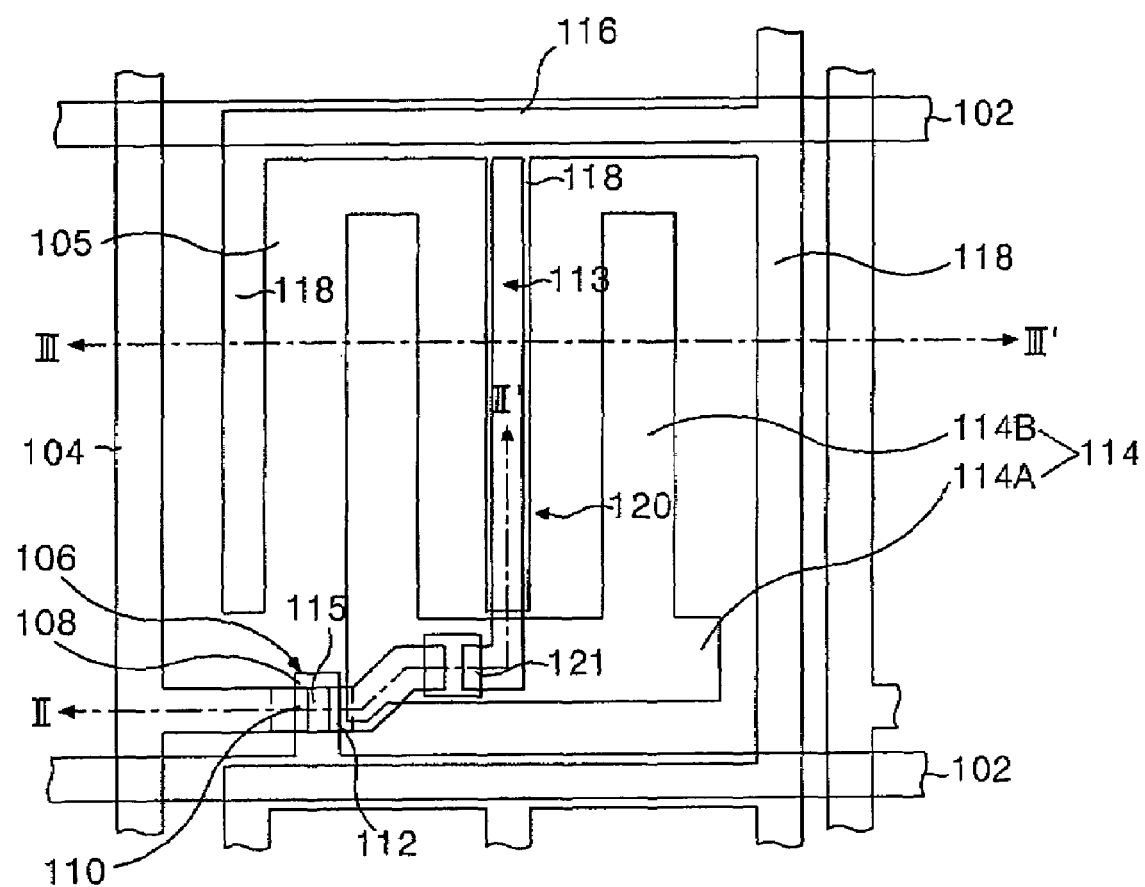
FIG. 4 is a plan view showing a part of a thin film transistor array substrate among a liquid crystal display panel of a horizontal electric field applying type according to a first embodiment of the present invention.
Figure 5:
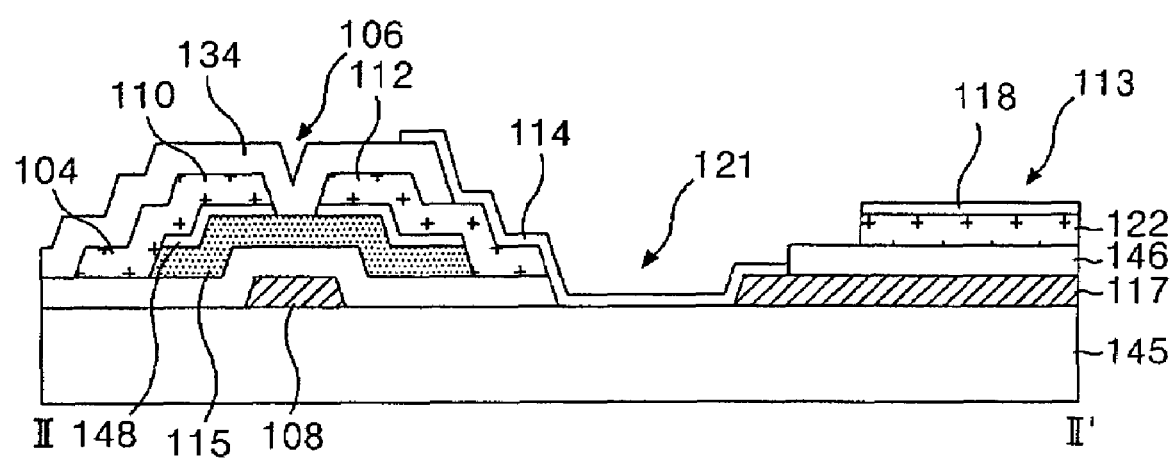
FIG. 5 is a sectional view showing a part of the thin film transistor array substrate taken along the line II-II' in FIG. 4.
Figure 6:
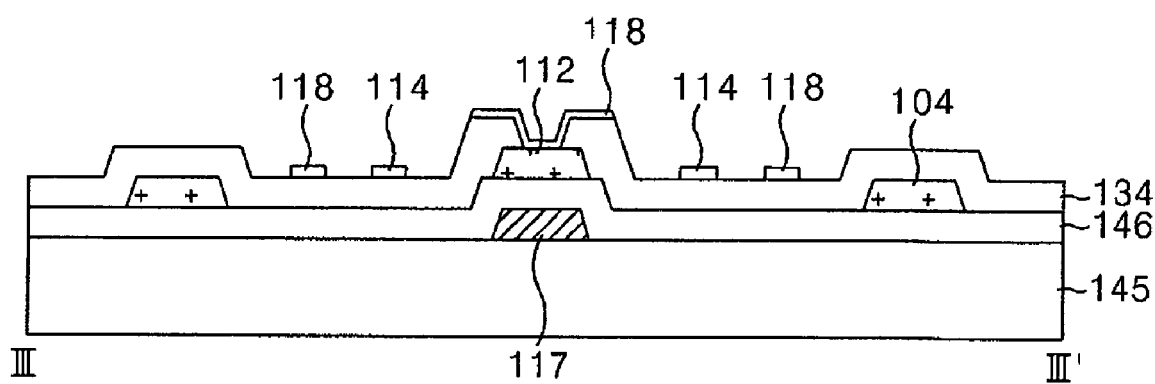
FIG. 6 is a sectional view showing a part of the thin film transistor array substrate taken along the line III-III' in FIG. 4.

FIG. 4 is a plan view showing a part of a thin film transistor array substrate among a liquid crystal display panel of a horizontal electric field applying type according to a first embodiment of the present invention. FIGS. 5 and 6 are sectional views showing a part of the thin film transistor array substrate taken along the lines II-II' and III-III' , respectively, in FIG. 4.

Referring to FIGS. 4 to 6, the thin film transistor array substrate of the horizontal electric field applying type according to the first embodiment of the present invention comprises a gate line 102 and a data line 104 formed on a lower substrate 145 crossing each other, a thin film transistor 106 formed at each crossing portion of the gate line 102 and the data line 104, a pixel electrode 114 and a common electrode 118 formed in order to apply a horizontal electric field in a pixel region 105 defined by the interconnection and a common line 116 connected to the common electrode 118. Moreover, the thin film transistor array substrate further comprises a storage capacitor 120 formed to overlap with the common electrode 118 of a middle part at the pixel region 105.

The gate line 102 supplies a gate signal to the gate electrode 108 of the thin film transistor 106. The data line 104 supplies a pixel signal to the pixel electrode 114 via the drain electrode 112 of the thin film transistor 106.

The gate line 102 and the data line 104 are formed in a crossing structure to define a pixel region 105.

The common line 116 overlaps the gate line 102 and is substantially parallel to the data line 104, and supplies a reference voltage used to drive the liquid crystal to the common electrode 118.

In response to the gate signal of the gate line 102, the pixel signal of the data line 104 is charged and maintained in the pixel electrode 114. To this end, the thin film transistor 106 comprises a gate electrode 108 connected to the gate line 102, and a source electrode 110 connected to the pixel electrode 114. In addition, the thin film transistor 106 further includes an active layer 115 overlapping the gate electrode 108 with a gate insulating film 146 positioned therebetween and defining a channel between the source electrode 110 and the drain electrode 112. On the active layer 115, an ohmic contact layer 148 for making an ohmic contact with the source electrode 110 and the drain electrode 112 is further provided.

The pixel electrode 114 is connected, via a first contact hole 121, to the drain electrode 112 of the thin film transistor 106 and is connected to a lower storage electrode 117. Particularly, the pixel electrode 114 comprises a horizontal part 114A connected to the drain electrode 112 and formed substantially parallel to an adjacent gate line 102, and a finger part 114B formed substantially parallel to the common electrode 118.

The common electrode 118 is connected to the common line 116 which is overlapped with the gate line 102 and formed in the pixel region 105. Particularly, the common electrode 118 is formed substantially parallel to the finger part 114B of the pixel electrode 114 in the pixel region 105. Moreover, the common electrode 118 is connected to an upper storage electrode 122 via a second contact hole 113 formed in the pixel region 105.

Accordingly, a horizontal electric field is applied between the pixel electrode 114, to which the pixel signal is supplied via the thin film transistor 106, and the common electrode 118, to which the reference voltage is supplied via the common line 116. Specifically, the horizontal electric field is formed between the finger part 114B of the pixel electrode 114 and the common electrode 118. The liquid crystal molecules arranged in a horizontal direction between the thin film transistor array substrate and the color filter array substrate by the horizontal electric field rotate due to a dielectric anisotropy. Further, the light transmittance transmitting through the pixel region 105 differs in accordance with a rotation amount of the liquid crystal molecules to represent the pictures.

The storage capacitor 120 includes the lower storage electrode 117 connected to the pixel electrode 114 and the upper storage electrode 122 overlapping the lower storage electrode 117 with the gate insulating film 146 positioned therebetween. Herein, the upper storage electrode 122 is connected to the common electrode 118 via the second contact hole 113 passing through the passivation film 134. Further, the upper storage electrode 122 functions as an etch stopper, to thereby protect the gate insulating film 146.

The storage capacitor 120 removes the passivation film 134 so as to expose the entire upper storage electrode 122 to form the second contact hole 113. Consequently, a stepped part between the common electrode 118 and the lower storage electrode 117 is decreased. As such, it is possible to decrease the un-uniformity of alignment of the liquid crystal. Such a storage capacitor 120 also allows a pixel signal charged in the pixel electrode 114 to be maintained until the next pixel signal is charged.

Figure 7A:
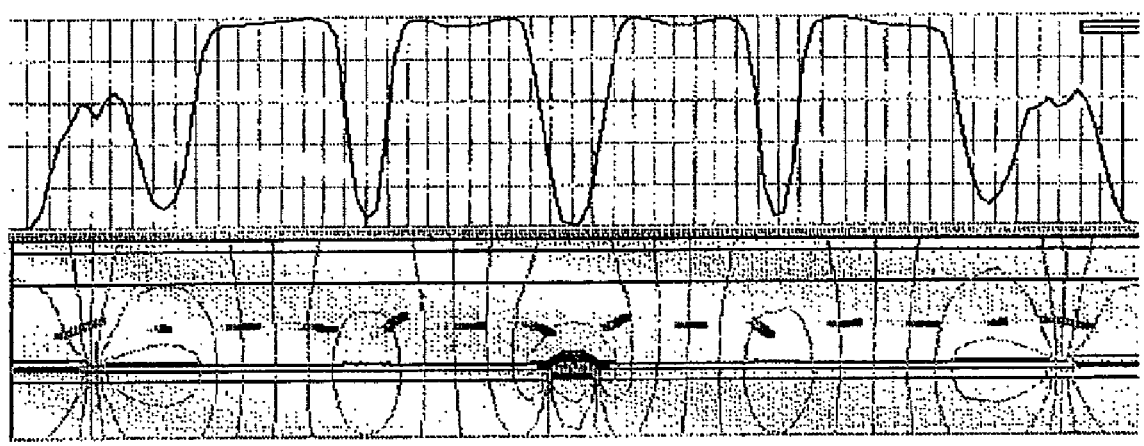
FIGS. 7A to 7C illustrate a transmittance rate of the liquid crystal display panel according to a first embodiment of the present invention.
Figure 7B:
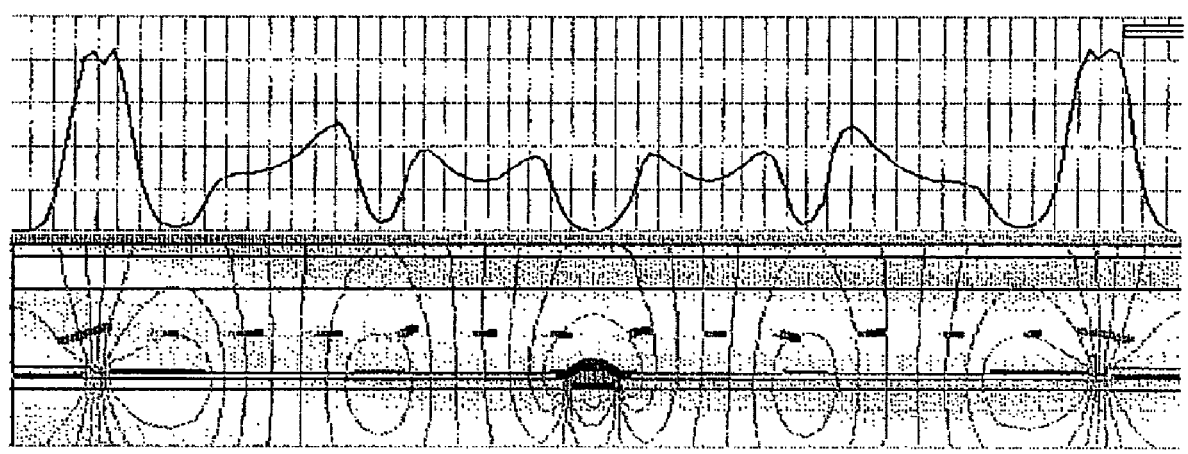
Figure 7C:
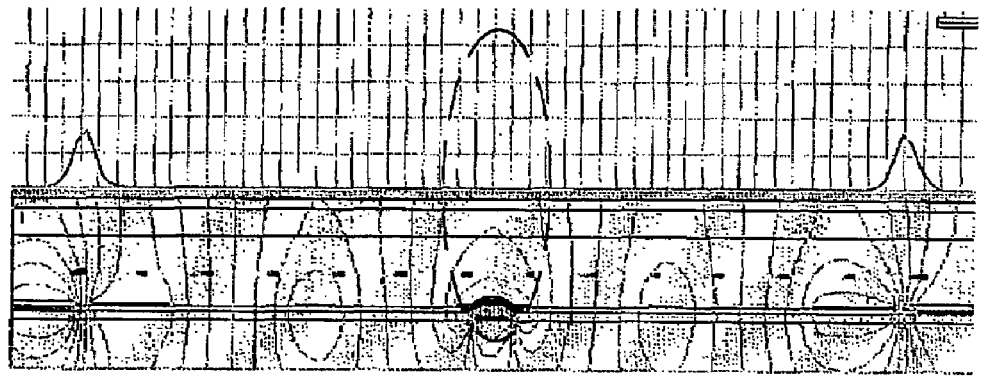
Figure 7C:
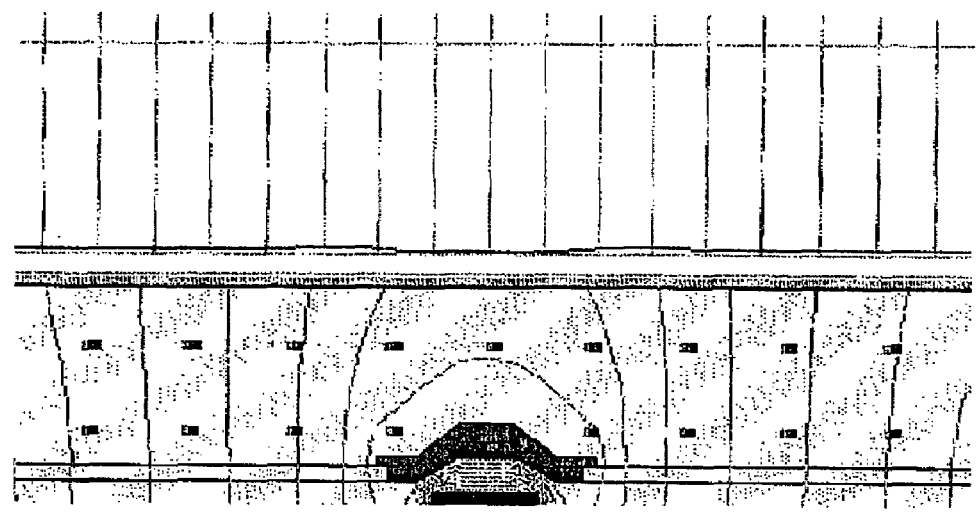

FIGS. 7A to 7C are status diagrams representing a driving state of liquid crystal material that is normally achieved when a storage capacitor is formed to overlap a common electrode at a middle part of a pixel region in accordance with the first embodiment of the present invention.

FIGS. 7A and 7B illustrate a transmittance rate at the time of implementing white and gray, respectively, and FIG. 7C illustrates a transmittance rate at the time of implementing black.

When an electric field is applied, liquid crystal materials are driven by a horizontal electric field between the pixel 114 and the common electrode 118 and an incident light from a light source (not shown) that passes through a region except for the pixel electrode 114, the common electrode 118 and the storage capacitor 120. Therefore, white and gray are implemented as shown in FIGS. 7A and 7B. In other words, liquid crystal materials are driven normally while a transmittance ratio, T, of the light is distributed symmetrically with respect to the storage capacitor 120.

When an electric field is not applied, the transmittance T is maintained to have a value of about 0.1%. Therefore, although the storage capacitor 120 is formed at the middle of the pixel region 105, the liquid crystal materials are driven normally.

As described above, in the thin film transistor array substrate according to the first embodiment of the present invention, the common line 116 is formed to overlap the gate line 102, and the storage capacitor 120 is formed to overlap the common electrode 118 that is extended from the middle part of the common line. Therefore, an aperture ratio is improved by an amount of an area occupied by the common line. Specifically, the aperture ratio is improved by removing a separation area arranged between the common line 116 and the gate line 102.

Figure 8A:
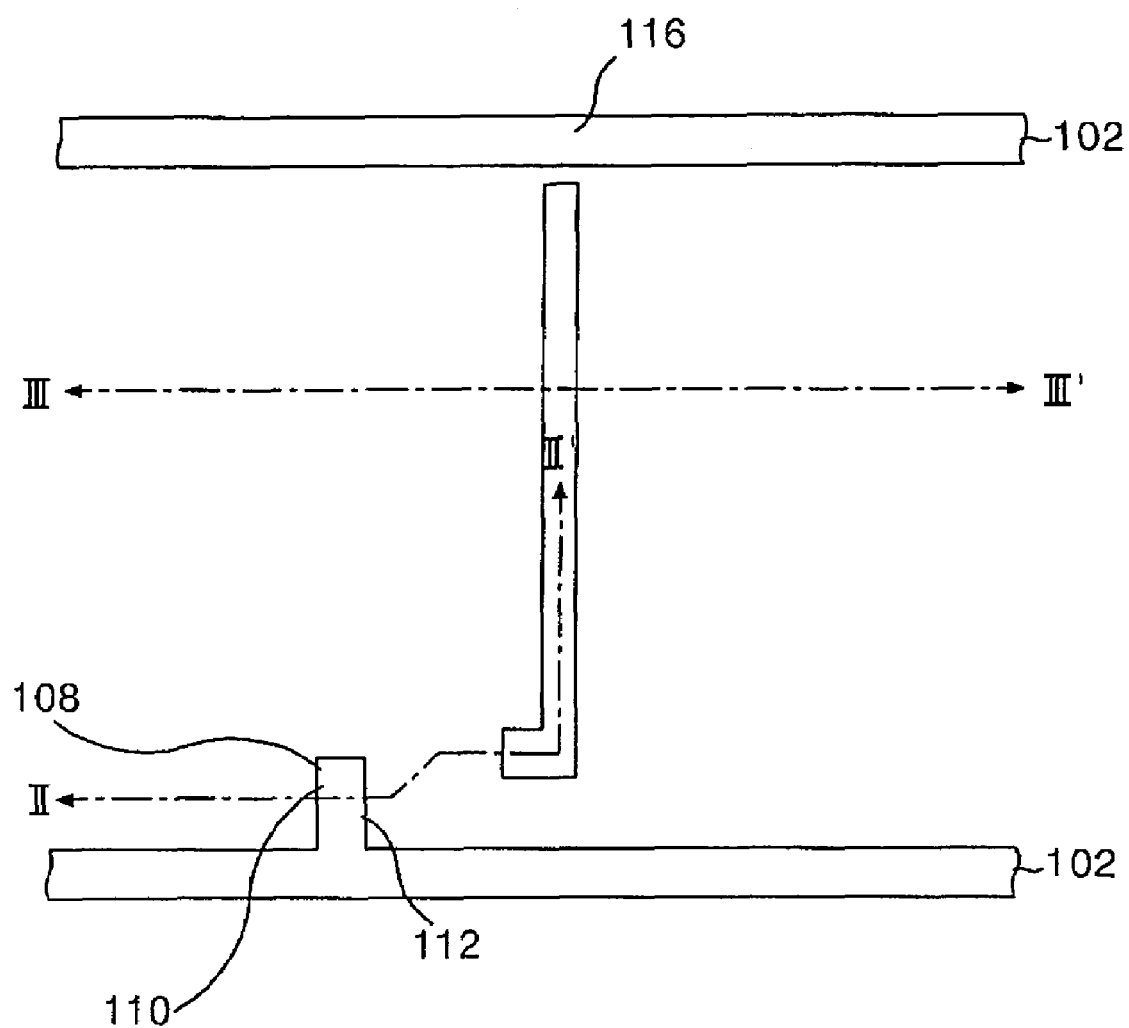
FIG. 8A and FIG. 8B are a plan view and a sectional view, respectively, illustrating a first mask process of a manufacturing method for the thin film transistor array substrate according to the first embodiment of the present invention, respectively.
Figure 8B:
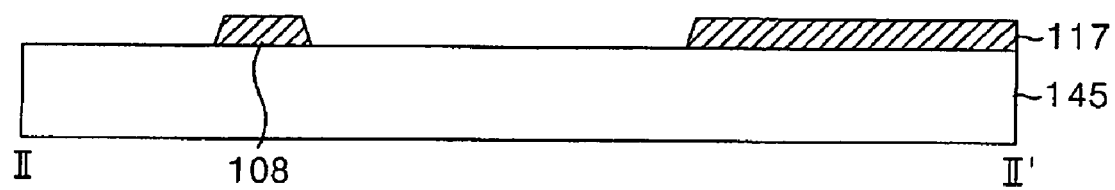

FIG. 8A and FIG. 8B are a plan view and a sectional view showing gate patterns, respectively, formed on a lower substrate by a first mask process of a manufacturing method of the thin film transistor array substrate according to the first embodiment of the present invention, respectively.

In FIGS. 8A and 8B, a gate metal layer is deposited on the lower substrate 145 by a deposition technique such as a sputtering. The gate metal layer is then patterned by a photolithography process and an etching process using a mask. Accordingly, a gate pattern including the gate line 102, the gate electrode 108 and the lower storage electrode 117 is formed. The gate metal may be formed with a mono layer or a double layer of chrome (Cr), molybdenum (Mo) or an aluminum system metal.

Figure 9A:
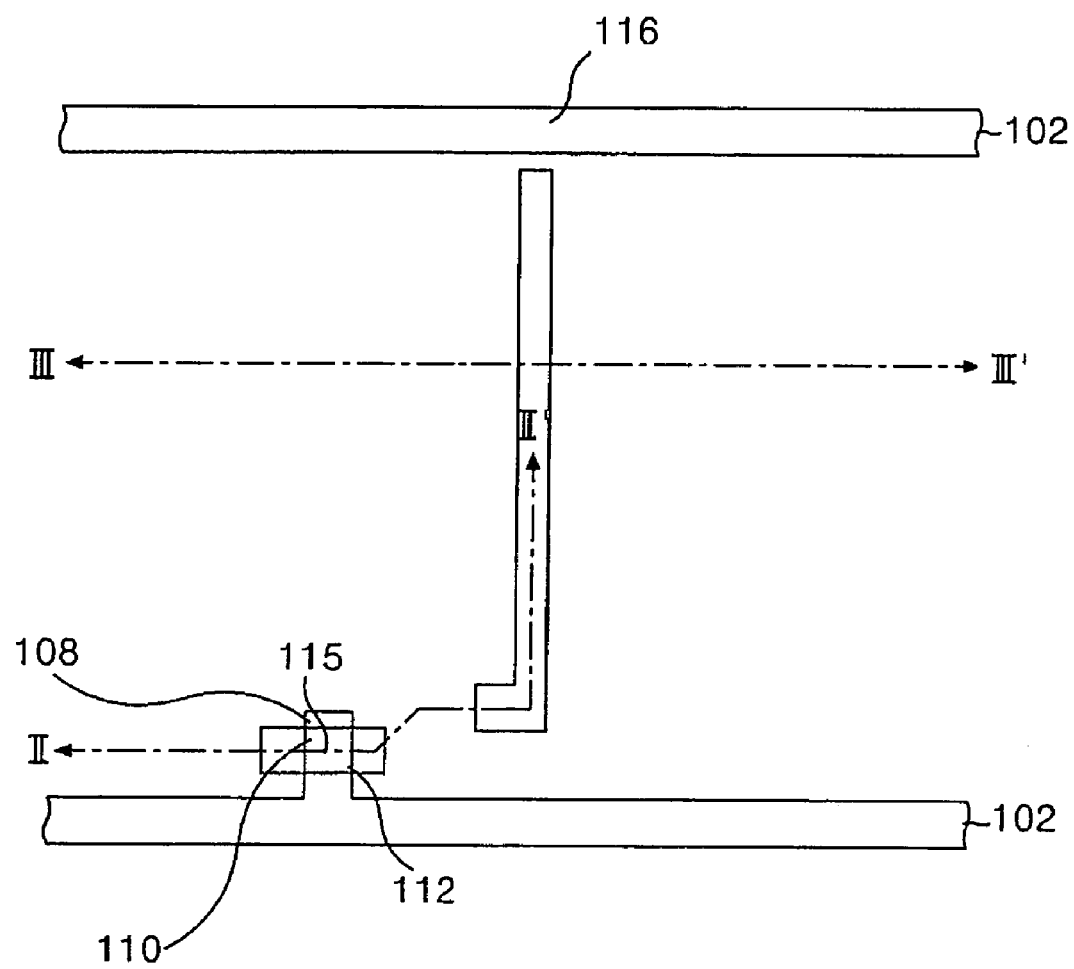
FIGS. 9A and 9B are a plan view and a sectional view, respectively, illustrating a second mask process of the manufacturing method for the thin film transistor array substrate according to the first embodiment of the present invention, respectively.
Figure 9B:
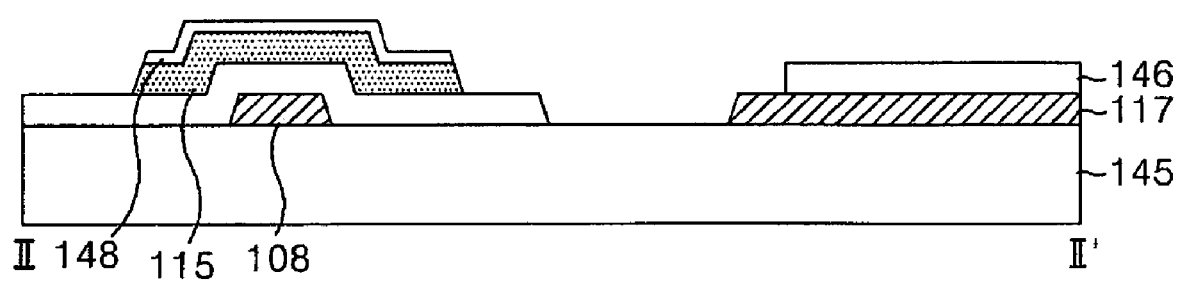

FIGS. 9A and 9B are a plan view and a sectional view showing an active layer and an ohmic contact layer formed on the lower substrate 145 by a second mask process of the manufacturing method of the thin film transistor array substrate according to the first embodiment of the present invention, respectively.

A gate insulating film 146 is formed on the lower substrate 145 provided with the gate pattern. The gate insulating film 146 is made of an inorganic insulating material such as silicon oxide (SiOx) or silicon nitride (SiNx).

On the lower substrate 145 provided with the gate insulating film 146, an amorphous silicon layer, and a n+ amorphous silicon layer are sequentially provided by deposition techniques such as a plasma enhanced chemical vapor deposition (PECVD) and sputtering.

The amorphous silicon layer and the n+ amorphous silicon layer are patterned by a photolithography process and an etching process using a mask. Accordingly, an active layer 115 and an ohmic contact layer 148 are formed.

Figure 10A:
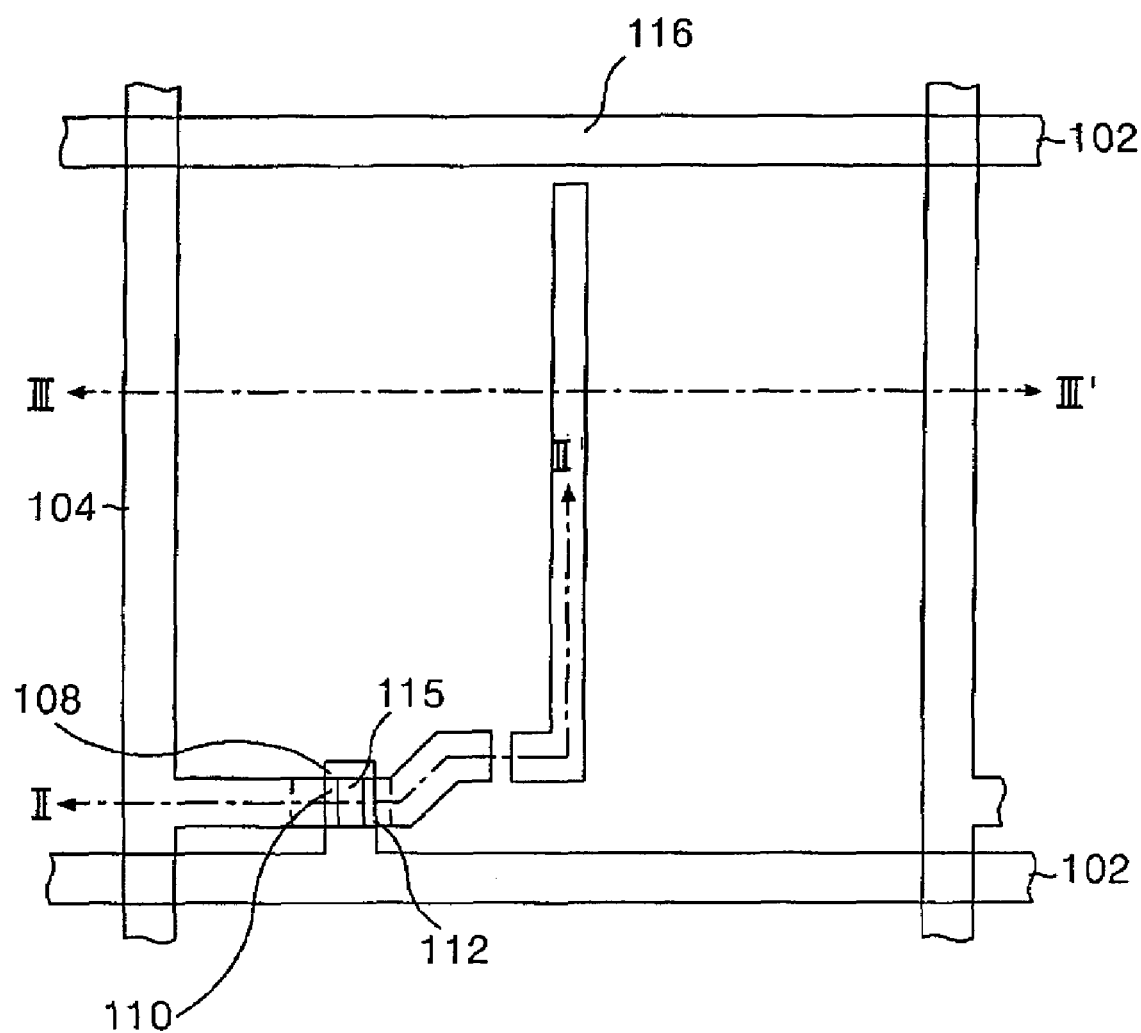
FIGS. 10A and 10B are a plan view and a sectional view, respectively, illustrating a third mask process of the manufacturing method for the thin film transistor array substrate according to the first embodiment of the present invention, respectively.
Figure 10B:
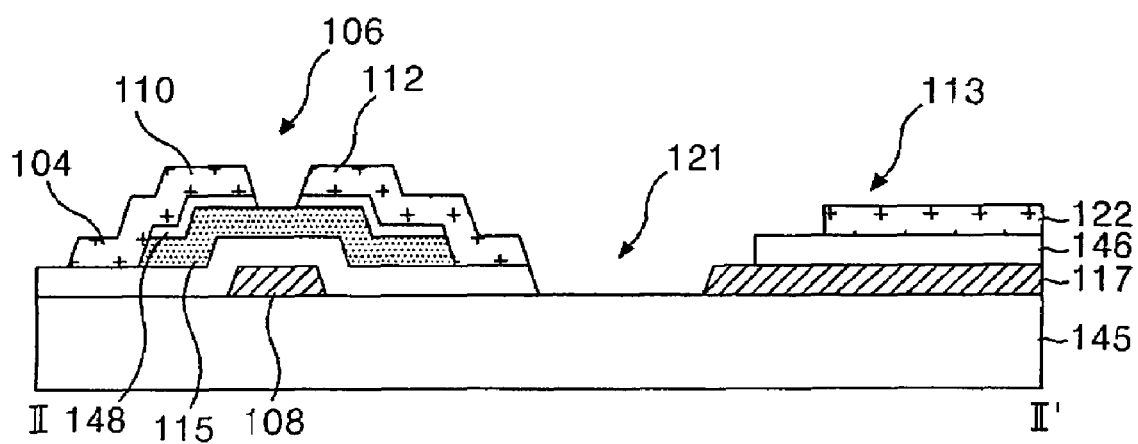

FIGS. 10A and 10B are a plan view and a sectional view showing a source/drain pattern formed on the lower substrate 145 by a third mask process of the manufacturing method of the thin film transistor array substrate according to the first embodiment of the present invention, respectively.

On the lower substrate 145 provided with the active layer 115 and the ohmic contact layer 148, a source/drain metal layer is formed entirely by deposition techniques such as plasma enhanced chemical vapor deposition (PECVD) and sputtering.

On the source/drain metal layer, a photo-resist pattern is formed by a photolithography process using a mask.

Subsequently, the source/drain metal layer is patterned by a wet etching process using the photo-resist pattern. Accordingly, source/drain patterns including the data line 104, the source electrode 110, the drain electrode 112 and the upper storage electrode 122 are formed.

Next, the ohmic contact layer 148 of a channel portion of the TFT is etched using the source electrode 110 and the drain electrode 112 as a mask to expose the active layer of the channel portion.

Figure 11A:
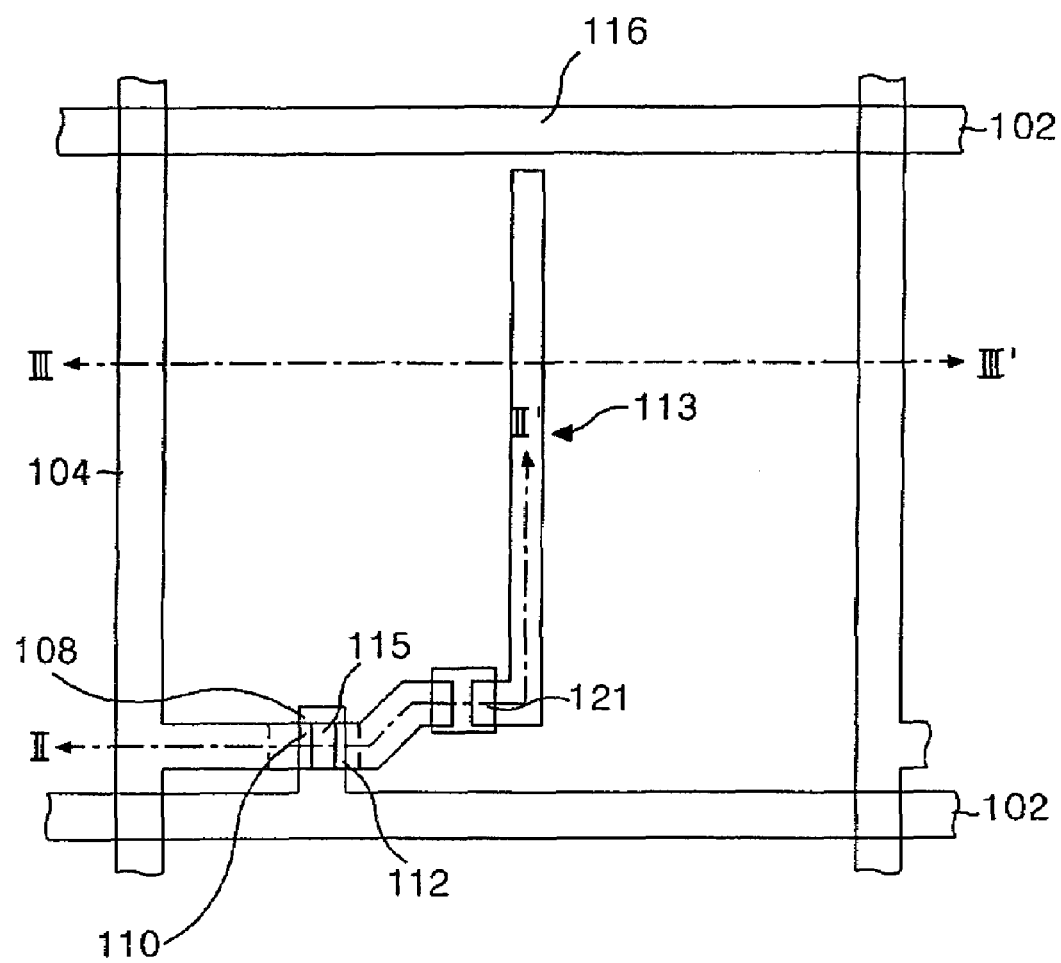
FIGS. 11A and 11B are a plan view and a sectional view, respectively, illustrating a fourth mask process of the manufacturing method for the a thin film transistor array substrate according to the first embodiment of the present invention, respectively.
Figure 11B:
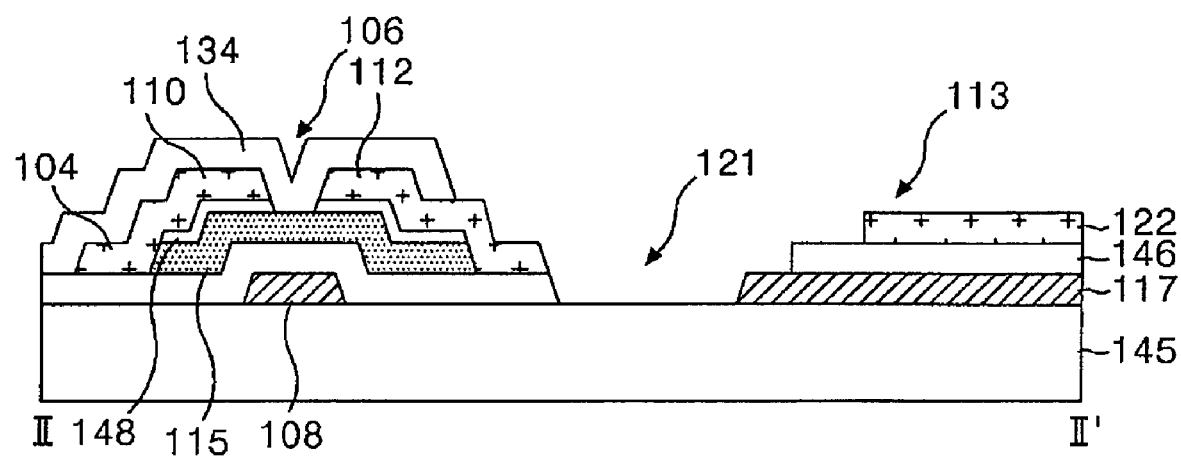

FIGS. 11A and 11B are a plan view and a sectional view showing a passivation film formed on the lower substrate by a fourth mask process of the manufacturing method of a thin film transistor array substrate according to the first embodiment of the present invention, respectively.

On the lower substrate 145 provided with the source/drain patterns, the passivation film 134 is formed, for example, entirely by deposition techniques such as plasma enhanced chemical vapor deposition (PECVD) and sputtering. The passivation film 134 is then patterned by a photolithography and etching process using a mask. Accordingly, a first contact hole 121 and a second contact hole 113 are formed. The first contact hole 121 is formed in such a manner as to pass through the passivation film 134 and expose the drain electrode 112 and the lower storage electrode 117, whereas the second contact hole 113 is formed in such a manner as to pass through the passivation film 134 and expose the upper storage electrode 122. The passivation film 134 may be made of an inorganic insulating material such as silicon oxide (SiOx) or silicon nitride (SiNx).

Figure 12A:
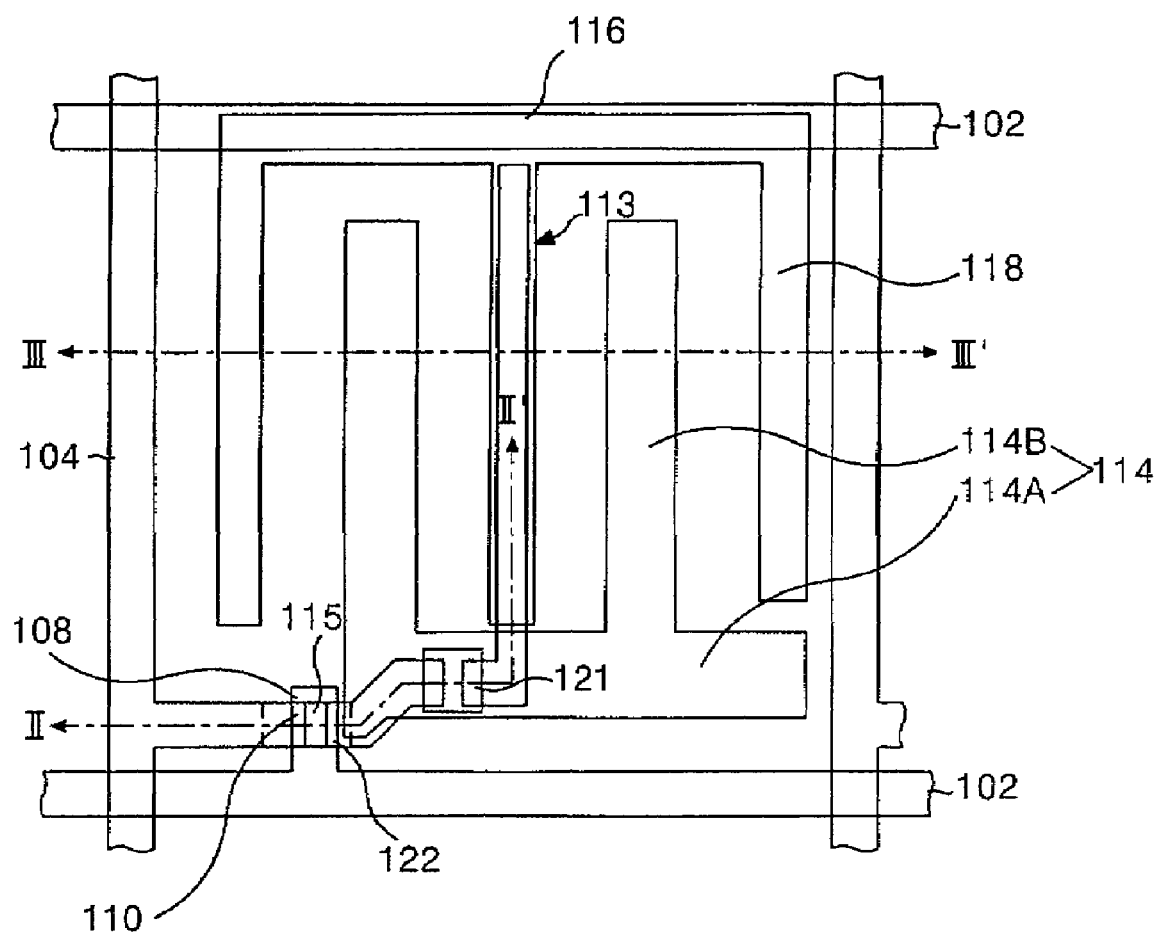
FIGS. 12A and 12B are a plan view and a sectional view, respectively, explaining a fifth mask process of the manufacturing method of a thin film transistor array substrate according to the first embodiment of the present invention, respectively.
Figure 12B:
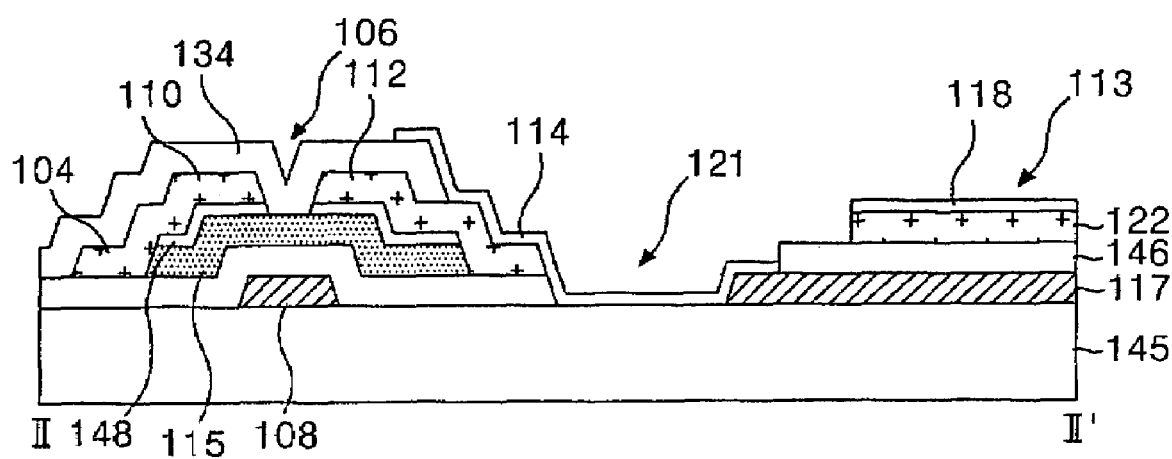

FIGS. 12A and 12B are a plan view and a sectional view showing a pixel electrode, a common electrode and a common line formed on the lower substrate by a fifth mask process of the manufacturing method of the thin film transistor array substrate according to the first embodiment of the present invention, respectively.

On the lower substrate 145 provided with the passivation film 134, a transparent electrode material is deposited using a deposition technique such as sputtering. The transparent electrode material may be made of indium-tin-oxide (ITO), tin-oxide (TO) or indium-zinc-oxide (IZO). Then, the transparent electrode material is patterned by a photolithography and etching process using a mask. Accordingly, a pixel electrode 114, a common line 116, and a common electrode 118 are formed. The pixel electrode 114 is electrically connected, via the first contact hole 121, to the drain electrode 112 and the lower storage electrode 117. The common electrode 118 is electrically connected, via the second contact hole 113, to the upper storage electrode 122.

Figure 13:
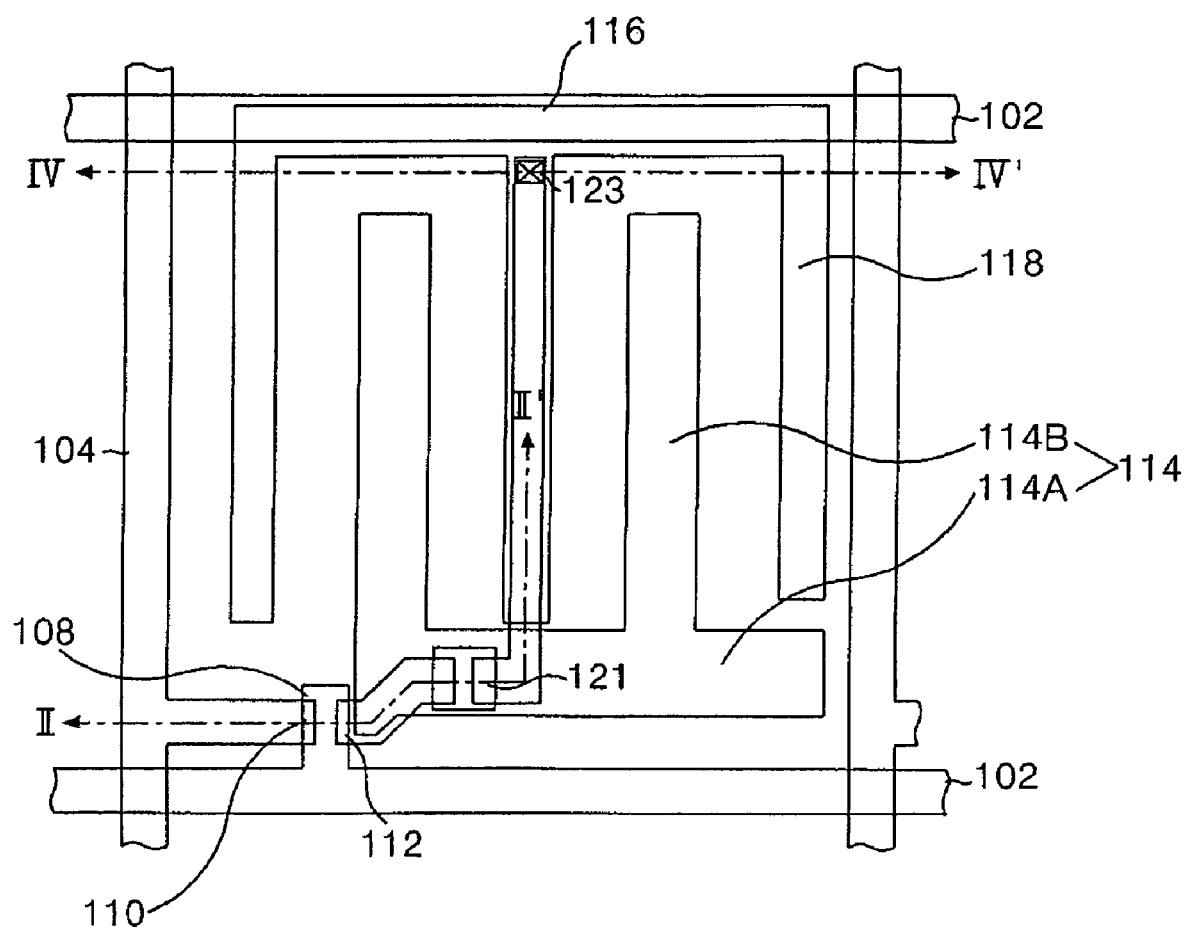
FIG. 13 is a plan view showing a part of a liquid crystal display of a horizontal electric field applying type according to a second embodiment of the present invention.
Figure 14:
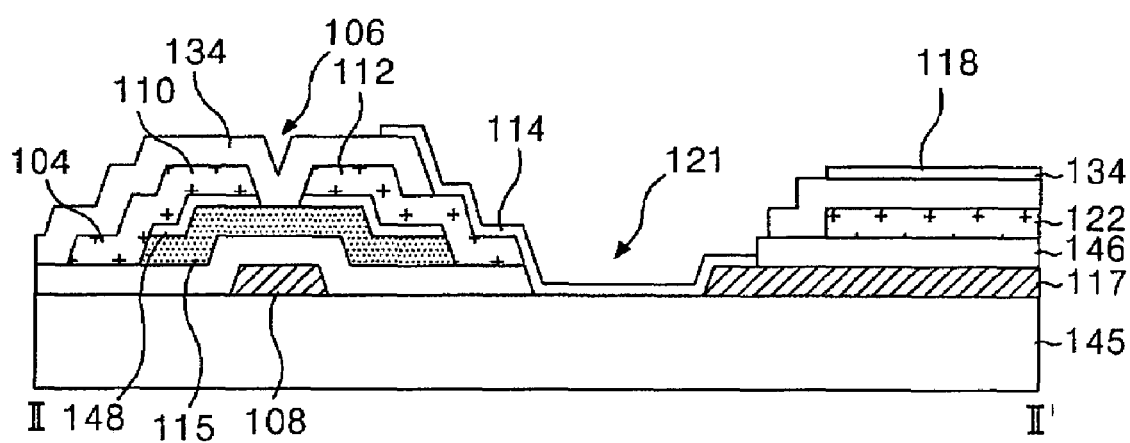
FIG. 14 is a sectional view showing a part of the thin film transistor array substrate taken along the line II-II' in FIG. 13.
Figure 15:
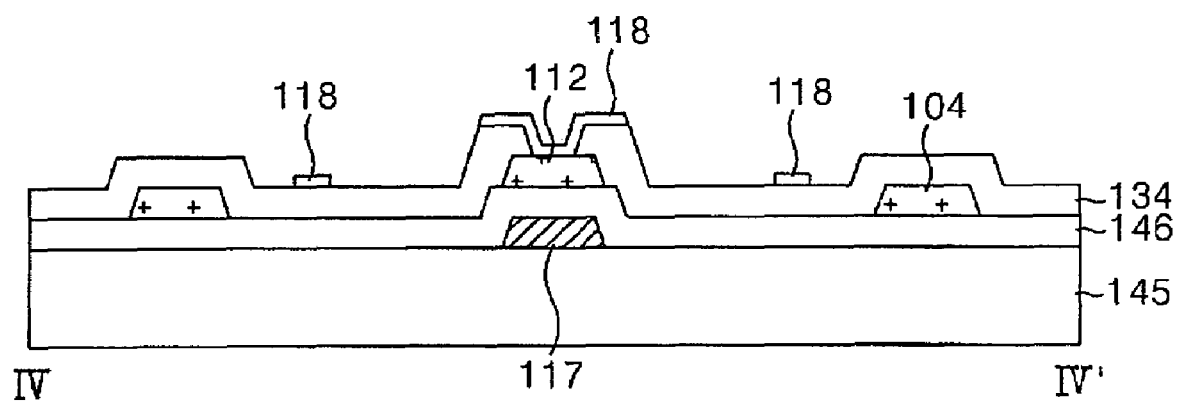
FIG. 15 is a sectional view showing a part of the thin film transistor array substrate taken along the line IV-IV' in FIG. 13.

FIG. 13 is a plan view showing a part of a liquid crystal display of a horizontal electric field applying type according to a second embodiment of the present invention. FIGS. 14 and 15 are sectional views showing a part of the thin film transistor array substrate along the lines II-II' and IV-IV' in FIG. 13, respectively.

The thin film transistor array substrate in FIGS. 13 to 15 identical elements to those of the thin film transistor array illustrated substrate illustrated in FIGS. 4 to 6 except that a second contact hole 123 of a passivation film 134 exposes a part of a storage electrode 122. Therefore, the elements identical to those of the thin film transistor array substrate in FIGS. 4 to 6 have identical numbers and their detailed explanation will be omitted.

The storage capacitor 120 includes a lower storage electrode 117 connected to a pixel electrode 114, an upper storage electrode 122 overlapping the lower storage electrode 117 with a gate insulating film 146 positioned therebetween, and a common electrode 118 connected, via the second contact hole 123 passing through and the passivation film 134 to thereby expose a part of the upper storage electrode 122.

As described in the first embodiment of the present invention, when the second contact hole is formed so as to entirely expose the upper storage electrode 122, there frequently occurs a case in which a contact hole having a uniform line width does not form. Accordingly, a line width of the contact hole has a wider design in order to ensure the line width of the contact hole is uniform. However, as the line width of the contact hole is widened, a line width of the upper storage electrode 122 is also widened. As a result, there is a problem that the aperture ratio is decreased. In order to overcome the problem, only a portion of the upper storage electrode 122 is exposed, via the second contact hole 123, to reduce an area occupied by the upper storage electrode 122 and improve the aperture ratio.

As described above, the thin film transistor array substrate according to the second embodiment of the present invention exposes only a portion of the upper storage electrode 122 of the storage capacitor 120 to reduce the area occupied by the upper storage electrode 122. Consequently, an aperture ratio can be improved.

Hereinafter, a method of fabricating the thin film transistor array substrate according to the second embodiment of the present invention will be described with reference to FIGS. 13 to 15.

First, on the lower substrate 145 provided with the source/drain pattern of the fabricating method shown in FIGS. 8A to 10B, the passivation film 134 is entirely formed by deposition techniques such as plasma enhanced chemical vapor deposition (PECVD) and sputtering. The passivation film 134 is then patterned by a photolithography and etching process using a mask. Accordingly, first and second contact holes 121 and 123 are formed. The first contact hole 121 is formed in such a manner as to pass through the passivation film 134 and expose the drain electrode 112 and the lower storage electrode 117. The second contact hole 123 is formed in such a manner as to pass through the passivation film 134 and expose a part of the storage electrode 122. The passivation film 134 may be made of an inorganic insulating material such as silicon oxide (SiOx) or silicon nitride (SiNx).

On the lower substrate 145 provided with the passivation film 134, a transparent electrode material is deposited using a deposition technique such as sputtering. Then, the transparent electrode material is patterned by the photolithography and the etching process using a mask. Accordingly, the pixel electrode 114, the common line 116 and the common 118 are formed. The pixel electrode 114 is electrically connected, via the first contact hole 121, to the drain electrode 112 and the lower storage electrode 117. The common electrode 118 is electrically connected, via the second contact hole 123, to the upper storage electrode 122. The transparent electrode material may be made of indium-tin-oxide (ITO), tin-oxide (TO) or indium-zinc-oxide (IZO).

Figure 16:
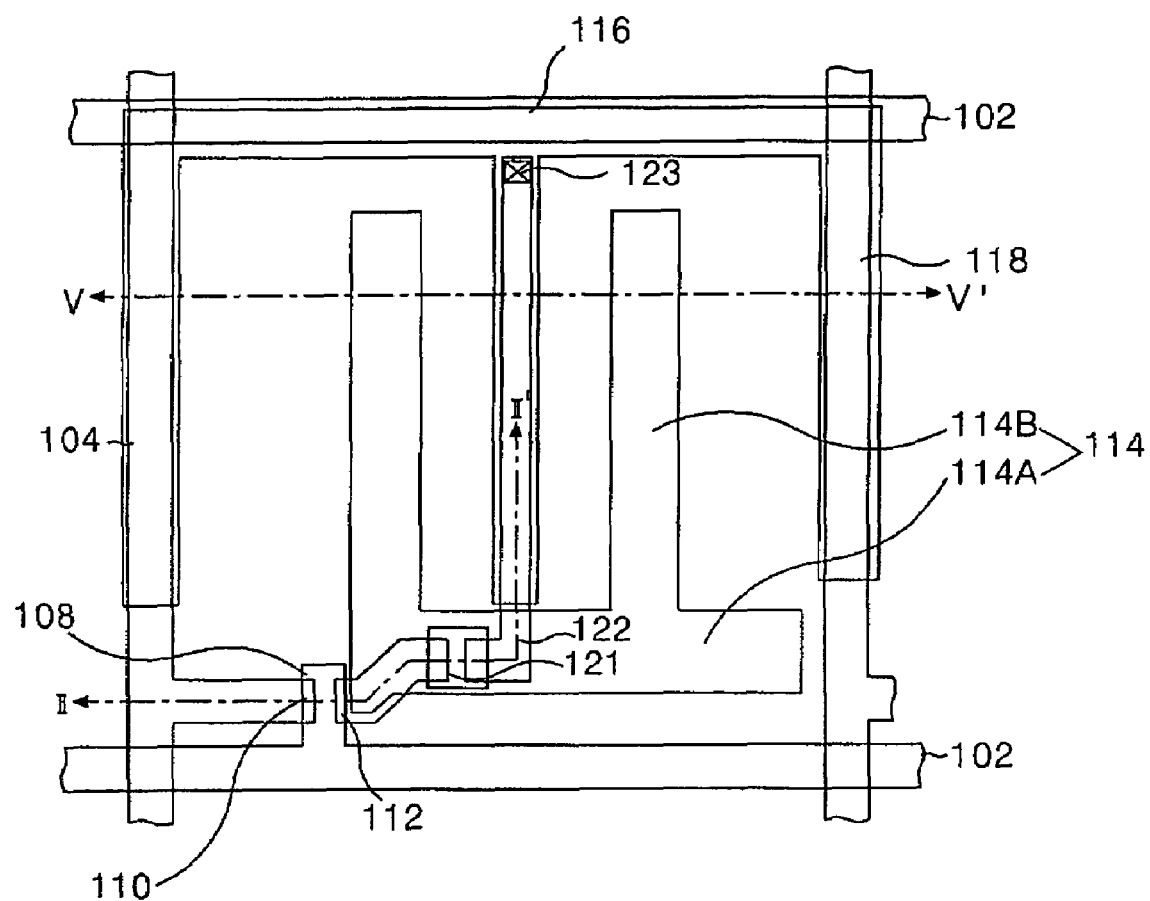
FIG. 16 is a plan view showing a part of a liquid crystal display of a horizontal electric field applying type according to a third embodiment of the present invention.
Figure 17:
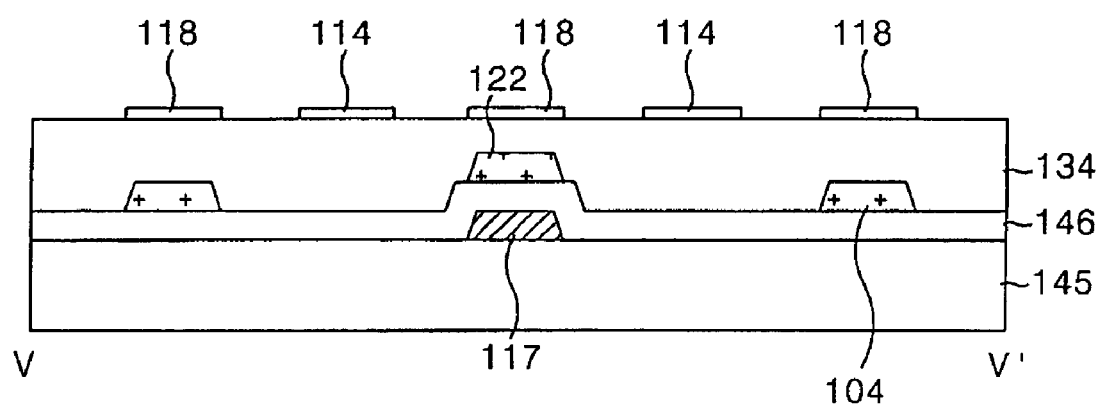
FIG. 17 is a sectional view showing a part of the thin film transistor array substrate taken along the line V-V' in FIG. 16.

FIG. 16 is a plan view showing a portion of a thin film transistor array substrate among the liquid crystal display panel of a horizontal electric field applying type according to a third embodiment of the present invention. FIG. 17 is a sectional view showing a portion of the thin film transistor array substrate along the line V-V' in FIG. 16. Further, the sectional view representing the portion of the thin film transistor array substrate along the line II-II' in FIG. 16 is identical to that of FIG. 15. Therefore, discussion of the sectional view of FIG. 16 will be omitted.

The thin film transistor array substrate shown in FIGS. 16 and 17 has elements identical to those of the thin film transistor array substrate shown in FIGS. 13-15 except that the common electrode 118 connected to both ends of the common line 116 overlaps the data line 104, and the passivation film 134 is made of an organic material.

Therefore, elements identical to those of the thin film transistor array substrate shown in FIGS. 13-15 have identical numbers and their detailed explanation will be omitted.

Referring to FIGS. 16 and 17, the common line 116 is formed to overlap the gate line 102, and the common electrode 118, connected to both ends of the common line 116, overlaps the data line 104.

The passivation film 134 is made of an organic insulating material having a small dielectric constant such as an acrylic organic compound, a BCB (benzocyclobutene) or a PFCB (perfluorocyclobutane). Therefore, the lower substrate 145 provided with the passivation film 134 is flattened.

As described above, in the thin film transistor array substrate according to the third embodiment of the present invention, the common line 116 overlaps the gate line 102, and the common electrode 118, connected to both ends of the common line 116, overlaps the data line 104. As a result, an aperture ratio is improved by an amount of the area occupied by the common line 116 and the common electrode 118. Moreover, the aperture ratio is improved by removing a separation area arranged between the common line 116 and the gate line 102.

In the thin film transistor array substrate according to the third embodiment of present invention, the common electrode 118, connected to both ends of the common line 116, overlaps the data line 104. Accordingly, an aperture ratio is improved by an amount of the area occupied by the common electrode 118.

Furthermore, in the thin film transistor array substrate according to the third embodiment of present invention, the passivation film 134 is made of an organic material. Accordingly, it is possible to make the alignment of liquid crystal materials uniform by removing a stepped part caused by the storage capacitor 120 to thereby prevent the light leakage. Also, because the passivation film 134 is made of an organic insulating material having a small dielectric constant and relative thickness, it is possible to reduce the magnitude of parasitic capacitors produced between the data line 104 and the common electrode 118 to prevent a coupling phenomenon.

Hereinafter, a method of fabricating the thin film transistor array substrate according to the third embodiment of the present invention will be described with reference to FIGS. 16 to 17.

First, on the lower substrate 145 provided with the source/drain pattern of the fabricating method shown in FIGS. 8A to 10B, an organic insulating material is formed entirely using a spin coating system. The organic insulating material is then patterned by a photolithography process and an etching process using a mask. Accordingly, first and a second contact holes 121 and 123 are formed. The first contact hole 121 is formed in such a manner as to pass through the passivation film 134 and expose the drain electrode 112 and the lower storage electrode 117, whereas the second contact hole 123 is formed in such a manner as to pass through the passivation film 134 and expose a part of the storage electrode 122. Herein, the organic insulating material is made of an acrylic organic compound, a BCB (benzocyclobutene) or a PFCB (perfluorocyclobutane) having a small dielectric constant.

On the lower substrate 145 provided with the passivation film 134, a transparent electrode material is deposited using a deposition technique such as sputtering. The transparent electrode material is then patterned by photolithography and an etching process using a mask. Accordingly, the pixel electrode 114, the common line 116 and the common electrode 118 are formed. The pixel electrode 114 is electrically connected, via the first contact hole 121, to the drain electrode 112 and the lower storage electrode 117. The common electrode 118, connected to both end terminals, overlaps the data line 104, and the common electrode 118 connected to the middle part of the common line 116 is electrically connected, via the second contact hole 123, to the upper storage electrode 122. The transparent electrode material may be made of indium-tin-oxide (ITO), tin-oxide (TO) or indium-zinc-oxide (IZO).

Figure 18:
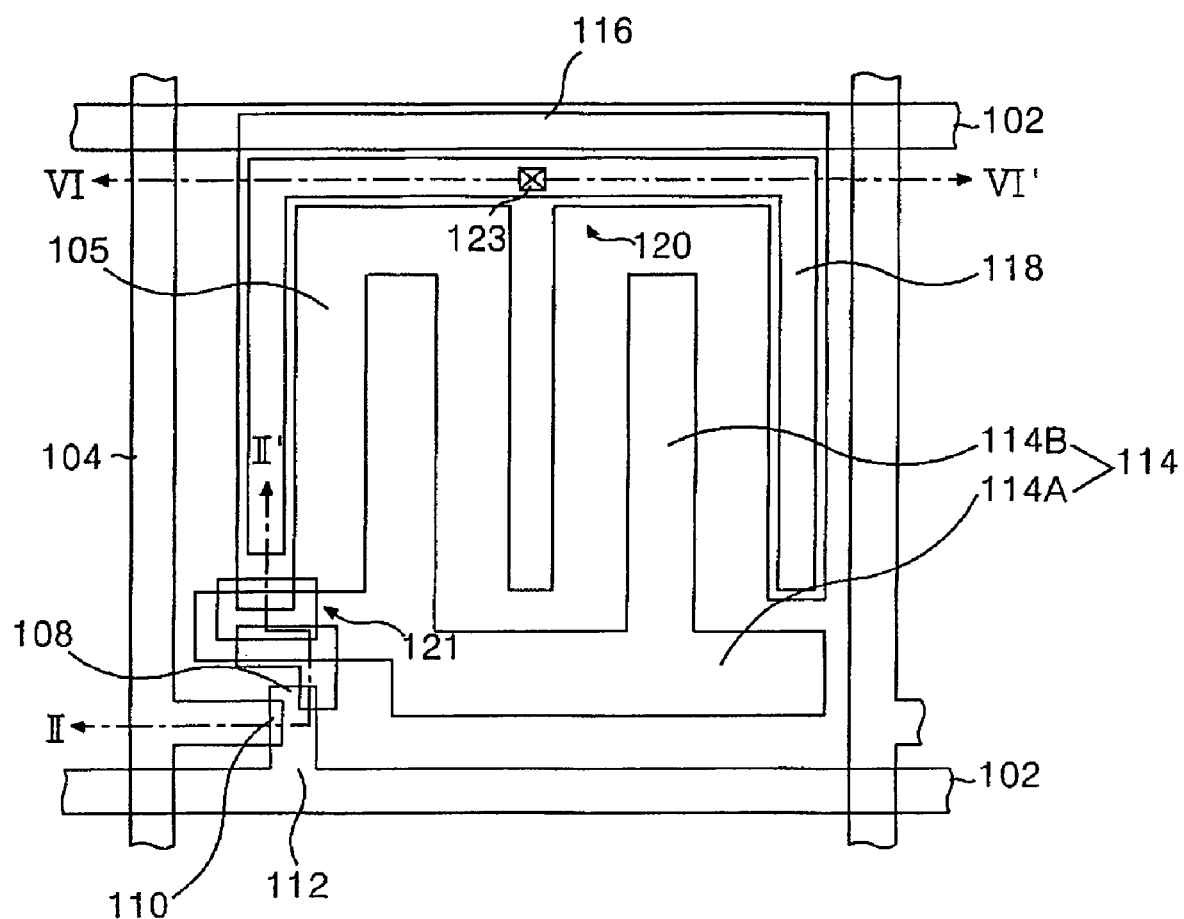
FIG. 18 is a plan view showing a part of a liquid crystal display of a horizontal electric field applying type according to a fourth embodiment of the present invention.
Figure 19:
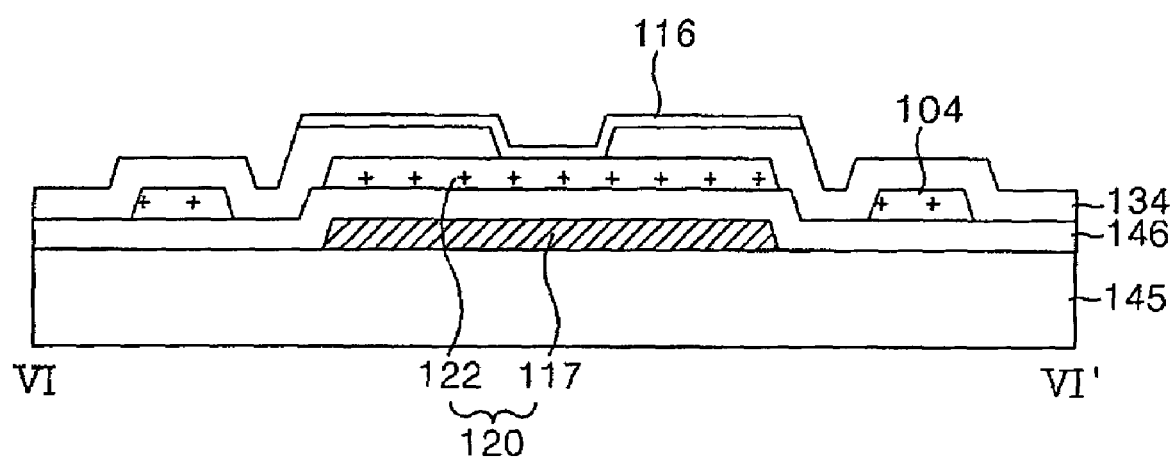
FIG. 19 is a sectional view showing a part of the thin film transistor array substrate along the line VI-VI' in FIG. 18.

FIG. 18 is a plan view showing a portion of a thin film transistor array substrate of a liquid crystal display panel of a horizontal electric field applying type according to a fourth embodiment of the present invention, and FIG. 19 is a sectional view showing a portion of the thin film transistor array substrate along the line VI-VI' in FIG. 18. The sectional view representing a portion of the thin film transistor array substrate along the line II-II' in FIG. 18 is identical to that of FIG. 15. Therefore, a discussion of the sectional view will be omitted.

The thin film transistor array substrate shown in FIGS. 18 to 19 has elements identical to those of the thin film transistor array substrate shown in FIGS. 13 and 14 except that a storage capacitor 120 is formed to overlap the common line 116 and the common electrode 118 connected to both ends of the common line 116, and the second contact hole 123 is located at the middle of the common line 116 to expose a part of the upper storage electrode 122. Therefore, the elements identical to those of the thin film transistor array substrate in FIGS. 13 and 14 will have identical reference numerals and their detailed explanation will be omitted.

In FIGS. 18 and 19, the common line 116 overlaps the gate line 102 and the storage capacitor 120 to supply a reference voltage for driving liquid crystal materials to the common electrode 118. Further, the common line 116 is connected, via the second contact hole 123, to the upper storage electrode 122.

The common electrode 118 is extended from the common line 116 to overlap the storage capacitor 120 and is formed in the pixel region 105.

The storage capacitor 120 is formed having an inverse shape of the letter 'U' to overlap the common line 116 and the common electrode 118. The storage capacitor 120 includes a lower storage electrode 117 connected to a pixel electrode 114, an upper storage electrode 122 overlapping the lower storage electrode 117 with the gate insulating film 146 positioned therebetween, and a common line 116 connected, via the second contact hole 123 exposing a part of the upper storage electrode 122, to the upper storage electrode 122. The storage capacitor 120 allows a pixel signal charged in the pixel electrode 114 to be maintained until the next pixel signal is charged.

As described above, in the thin film transistor array substrate according to the fourth embodiment of the present invention, the common line 116 overlaps with a portion of the gate line 102 and the storage capacitor. Accordingly, a portion of the area occupied by the common line 116 overlaps with the gate line 102 in comparison to the related art, so that an aperture ratio is improved by an amount of the area overlapped with the data line 116 and the gate line 102.

Hereinafter, a method of fabricating the thin film transistor array substrate according to the fourth embodiment of the present invention will be described with reference to FIGS. 18 and 19.

A gate metal layer is deposited on the upper substrate 145 by a deposition technique such as sputtering. Then, the gate metal layer is patterned by a photolithography and etching process using a mask. Accordingly, a gate pattern including the gate line 102, the gate electrode 108 and a lower storage electrode 117 having an inverse shape of a letter 'U' is formed. Herein, a gate metal is formed to have a mono layer or a double layer of chrome (Cr), molybdenum (Mo) or aluminum system metal.

Pursuant to the fabricating method shown in FIGS. 9A to 12B, the active layer 115, the ohmic contact layer 148, the source/drain pattern including the data line 104, the source electrode 110, the drain electrode 112 and the upper storage electrode 122, the passivation film including the first contact hole 121 and the second contact hole 123, and the common line 116 connected to the pixel electrode 114 and the common electrode 118 are formed.

Figure 20:
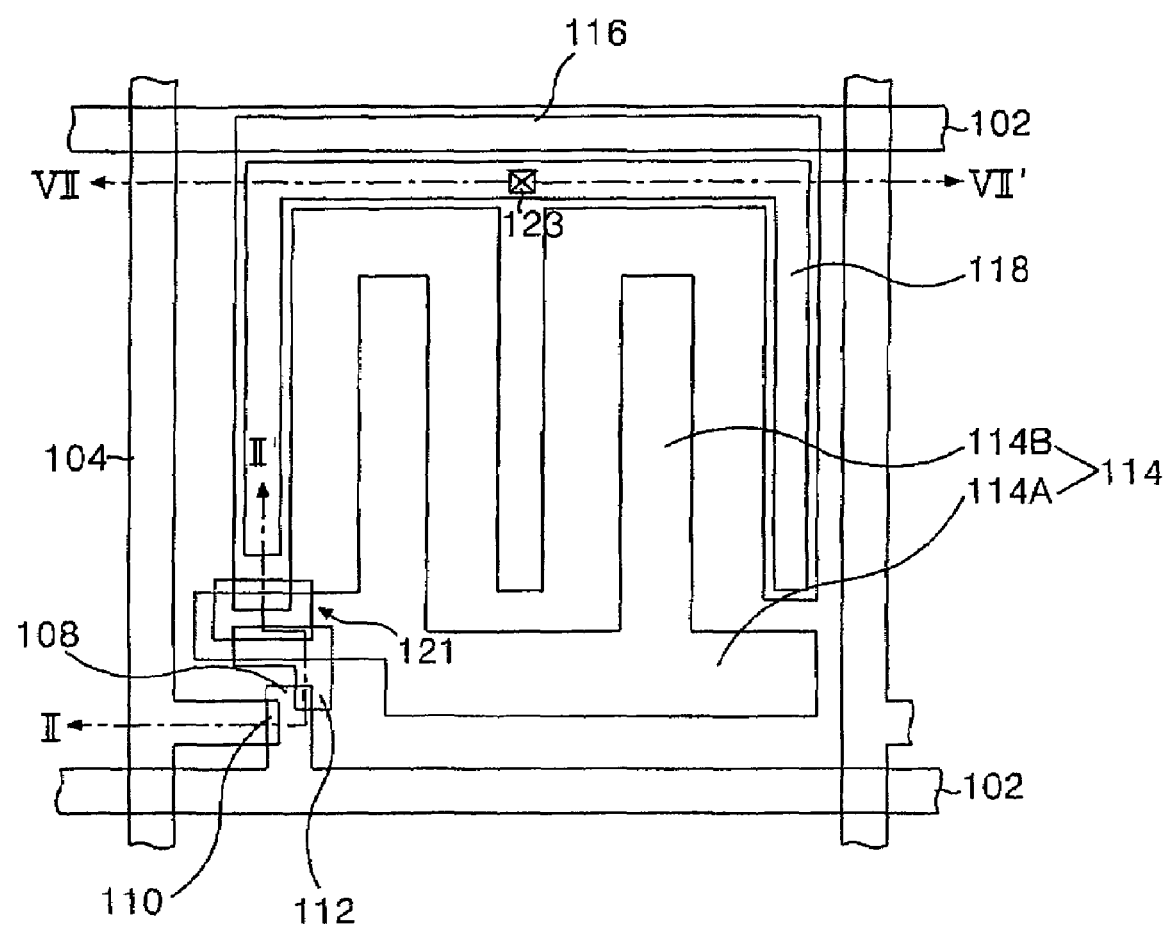
FIG. 20 is a plan view showing a part of a liquid crystal display of a horizontal electric field applying type according to a fifth embodiment of the present invention.
Figure 21:
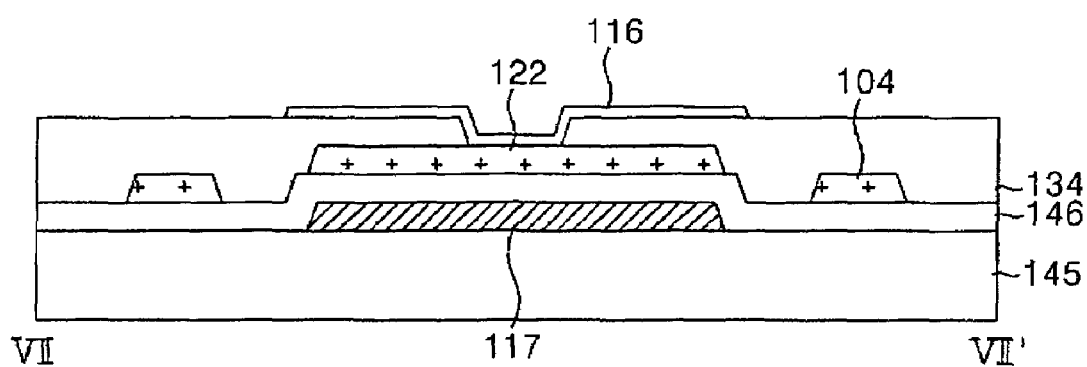
FIG. 21 is a sectional view showing a part of the thin film transistor array substrate taken along the line VII-VII' in FIG. 20.

FIG. 20 is a plan view showing a portion of a thin film transistor array substrate of the liquid crystal display panel of a horizontal electric field applying type according to a fifth embodiment of the present invention, and FIG. 21 is a sectional view showing a portion of the thin film transistor array substrate along the line VII-VII' in FIG. 20. The sectional view representing the part of the thin film transistor array substrate along the line II-II' in FIG. 20 is identical to that of FIG. 15. Therefore, a discussion of the sectional view will be omitted.

The thin film transistor array substrate shown in FIGS. 20 and 21 has elements identical to those of the thin film transistor array substrate shown in FIGS. 18 and 19 except that a passivation film is made of an organic material. Therefore, the elements identical to those of the thin film transistor array substrate shown in FIGS. 18 and 19 will have identical numbers and their detailed explanation will be omitted.

In FIGS. 20 and 21, the passivation film 134 is made of an organic insulating material having a small dielectric constant such as an acrylic organic compound, a BCB (benzocyclobutene) or a PFCB (perfluorocyclobutane). Therefore, the lower substrate 145 provided with the passivation film 134 is flattened.

In the thin film transistor array substrate according to the fifth embodiment of the present invention, the common line 116 overlaps a part of the gate line 102 and the storage capacitor. Accordingly, a portion of the area occupied by the common line 116 overlaps the gate line 102 in comparison to the related art so that an aperture ratio is improved by an amount of the area overlapped with the data line 116 and the gate line 102.

Furthermore, in the thin film transistor array substrate according to the fifth embodiment of present invention, the passivation film 134 is made of an organic material. Accordingly, it is possible to make the alignment of liquid crystal materials uniform by removing a stepped part caused by the storage capacitor 120 to prevent the light leakage. Also, because the passivation film 134 is made of an organic insulating material having a small dielectric constant and a relative thickness, it is possible to reduce the magnitude of parasitic capacitors produced between the data line 104 and the common electrode 118 to prevent a coupling phenomenon.

Hereinafter, a method of fabricating the thin film transistor array substrate of the fifth embodiment of the present invention will be described with reference to FIGS. 20 and 21.

The thin film transistor array substrate according to the fifth embodiment of the present invention may be formed, for example, by the fabricating method identical to that of the thin film transistor array substrate according to the fourth embodiment except that a passivation film 134 is made of an organic material. Therefore, the detailed explanation of the fabricating method identical to that of the thin film transistor array substrate of the fourth embodiment will be omitted.

On the lower substrate 145 provided with the source/drain pattern, an organic insulating material is formed entirely using a spin coating system. The organic insulating material is then patterned by a photolithography process and etching process using a mask. Accordingly, first and a second contact holes 121 and 123 are formed. The first contact hole 121 is formed in such a manner as to pass through the passivation film 134 and expose the drain electrode 112 and the lower storage electrode 117, whereas the second contact hole 123 is formed in such a manner as to pass through the passivation film 134 and expose a part of the storage electrode 122. Herein, the organic insulating material is made of an acrylic organic compound, a BCB (benzocyclobutene) or a PFCB (perfluorocyclobutane) having a small dielectric constant.

On the lower substrate 145 provided with the passivation film 134, a transparent electrode material is deposited by a deposition technique such as sputtering. The transparent electrode material may be made of indium-tin-oxide (ITO), tin-oxide (TO) or indium-zinc-oxide (IZO). The transparent electrode material is then patterned by a photolithography and etching process using a mask. Accordingly, the pixel electrode 114, the common line 116 and the common electrode 118 are formed. The pixel electrode 114 is electrically connected, via the first contact hole 121, to the drain electrode 112 and the lower storage electrode 117. The common electrode 118, connected to both end terminals of the common line, overlaps the data line 104, and the common electrode 118 connected to the middle part of the common line 116 is electrically connected, via the second contact hole 123, to the upper storage electrode 122.

As described above, in the liquid crystal display panel of a horizontal electric field applying type and the fabricating method thereof according to the present invention, the common line and common electrode are formed to overlap with at least one of a gate line and a data line. Therefore, an aperture can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel of a horizontal electric field applying type comprising:
   a gate line formed on a substrate;
   a data line crossing the gate line with a gate insulating film positioned therebetween, the crossing of the data line and gate line defining a pixel region;
   a thin film transistor including a source electrode and a drain electrode formed at the crossing of the gate and data lines;
   a passivation film for protecting the thin film transistor;
   a common line overlapped with and insulated from at least one of the gate line and the data line;
   a plurality of common electrodes connected to the common line, a common electrode of the plurality of common electrodes overlapped with the data line;
   a pixel electrode connected to the drain electrode, wherein a horizontal electric field is formed between the common electrodes and the pixel electrode; and
   a storage capacitor substantially parallel with the data line, the storage capacitor including a lower storage electrode on the substrate and connected to the pixel electrode, the gate insulating film formed on the lower storage electrode, and an upper storage electrode on the gate insulating film and connected to at least one of the common electrodes, and being insulated from the lower storage electrode by the gate insulating film, wherein the lower storage electrode and the upper storage electrode overlap with the at least one common electrode, and wherein the lower storage electrode is formed of a same material as the gate line and the upper storage electrode is formed of a same material as the data line.

2. The liquid crystal display panel of claim 1, wherein the common line overlaps the gate line, and wherein the gate insulating film and the passivation film are positioned between the common line and gate line.

3. The liquid crystal display panel of claim 1, wherein the passivation film is positioned between the common electrode and data line.

4. The liquid crystal display panel of claim 2 or 3, wherein the upper storage electrode is connected to the common electrode.

5. The liquid crystal display panel of claim 4, wherein the pixel electrode is connected, via a first contact hole exposing the drain electrode and the lower storage electrode, to the drain electrode and the lower storage electrode.

6. The liquid crystal display panel of claim 4, wherein the upper storage electrode overlaps the common electrode.

7. The liquid crystal display panel of claim 4, wherein the upper storage electrode is connected, via a second contact hole passing through the passivation film, to the common electrode.

8. The liquid crystal display panel of claim 7, wherein the second contact hole is elongated along the upper storage electrode.

9. The liquid crystal display panel of claim 1, wherein the common line is formed on the gate line and in the pixel region.

10. The liquid crystal display panel of claim 9, wherein the lower storage electrode overlaps the common line and the common electrode while being insulated therefrom.

11. The liquid crystal display panel of claim 10, wherein the common electrode overlapped by the upper storage electrode is substantially parallel and adjacent to the data line.

12. The liquid crystal display panel of claim 1, wherein the passivation film is made of an organic material.

13. The liquid crystal display panel of claim 1, wherein each of the pixel electrode, the common electrode and the common line includes a transparent conductive material.

14. A method of fabricating a liquid crystal display panel of horizontal electric field applying type, comprising:
   forming a gate line on a substrate;
   forming a data line crossing the gate line, with a gate insulating film positioned therebetween, the crossing of the data and gate line defining a pixel region;
   forming a thin film transistor including a source electrode and a drain electrode formed at the crossing of the gate and data lines;
   forming a passivation film to protect the thin film transistor;
   forming a common line overlapped with and insulated from at least one of the gate line and the data line;
   forming a plurality of common electrodes connected to the common line, and a common electrode of the plurality overlapped with the data line;
   forming a pixel electrode connected to the drain electrode, wherein a horizontal electric field is formed between the common electrodes and the pixel electrode; and
   forming a storage capacitor including forming a lower storage electrode on the substrate connected to the pixel electrode, forming a gate insulating layer on the lower storage electrode, and forming an upper storage electrode connected to at least one of the common electrodes and on the gate insulating layer, and being insulated from the lower storage electrode by the gate insulating layer, wherein the lower storage electrode and the upper storage electrode overlap with the at least one common electrode and wherein the lower storage electrode is formed of a same material as the gate line and the upper storage electrode is formed of a same material as the data line.

15. The method of claim 14, wherein the common line is formed to overlap the gate line, and wherein the gate insulating film and the passivation film are positioned between the common line and gate line.

16. The method of claim 14, wherein the passivation film is positioned between the common electrode and data line.

17. The method of claim 15 or 16, wherein the upper storage electrode is connected to the common electrode.

18. The method of claim 17, wherein the pixel electrode is connected, via a first contact hole exposing the drain electrode and the lower storage electrode, to the drain electrode and the lower storage electrode.

19. The method of claim 17, wherein the upper storage electrode overlaps with the common electrode.

20. The method of claim 17, wherein the upper storage electrode is connected, via a second contact hole passing through the passivation film, to the common electrode.

21. The method of claim 20, wherein the second contact hole is elongated along the upper storage electrode.

22. The method of claim 14, wherein the common line is formed on the gate line and in the pixel region.

23. The method of claim 22, wherein the lower storage electrode overlaps the common line and the common electrode while being insulated therefrom.

24. The method of claim 23, wherein the lower storage electrode and the upper storage electrode overlap the common electrode, the common electrode being substantially parallel and adjacent to the data line.

25. The method of claim 14, wherein the passivation film is made of an organic material.

26. The method of claim 14, wherein each of the pixel electrode, the common electrode and the common line are made of a transparent conductive material.

* * * * *